US011964741B2

(12) United States Patent
Claus et al.

(10) Patent No.: US 11,964,741 B2
(45) Date of Patent: Apr. 23, 2024

(54) DEVICES, METHODS, AND SYSTEMS FOR UNDERWATER SURVEYING

(71) Applicant: OCEAN FLOOR GEOPHYSICS INC., Burnaby (CA)

(72) Inventors: Brian Claus, Burnaby (CA); Craig Donald, Malaysia (GB); Peter Kowalczyk, Surrey (CA); Matthew Kowalczyk, Burnaby (CA)

(73) Assignee: OCEAN FLOOR GEOPHYSICS, INC., Burnaby (CA)

( * ) Notice: Subject to any disclaimer, the term of this patent is extended or adjusted under 35 U.S.C. 154(b) by 861 days.

(21) Appl. No.: 16/963,750

(22) PCT Filed: Jan. 24, 2019

(86) PCT No.: PCT/IB2019/000375
§ 371 (c)(1),
(2) Date: Jul. 21, 2020

(87) PCT Pub. No.: WO2019/145798
PCT Pub. Date: Aug. 1, 2019

(65) Prior Publication Data
US 2021/0094660 A1 Apr. 1, 2021

Related U.S. Application Data

(60) Provisional application No. 62/621,486, filed on Jan. 24, 2018.

(51) Int. Cl.
*B63B 79/10* (2020.01)
*B63G 8/00* (2006.01)
(Continued)

(52) U.S. Cl.
CPC .............. *B63B 79/10* (2020.01); *B63G 8/001* (2013.01); *C23F 13/22* (2013.01); *G01V 3/088* (2013.01);
(Continued)

(58) Field of Classification Search
None
See application file for complete search history.

(56) References Cited

U.S. PATENT DOCUMENTS

2018/0290717 A1\* 10/2018 Byrd ........................ C23F 13/22
2018/0363149 A1\* 12/2018 Dingman ................ C23F 13/22

FOREIGN PATENT DOCUMENTS

| GB | 2124382 | 2/1984 |
| WO | WO 2016/178045 | 11/2016 |
| WO | WO 2017/126975 | 7/2017 |

OTHER PUBLICATIONS

Constable "Review paper: Instrumentation for marine magnetotelluric and controlled source electromagnetic sounding," Geophysical Prospecting, Jun. 2013, vol. 61, No. s1, pp. 505-532.
(Continued)

*Primary Examiner* — Jas A Sanghera
(74) *Attorney, Agent, or Firm* — Sheridan Ross P.C.

(57) ABSTRACT

A method includes receiving electric field data regarding an electric field that is detected in an underwater environment by a plurality of electrodes mounted on a first structure, and receiving sensor data from at least one sensor mounted on the first structure. The sensor data relates to a sensed location of a second structure. The method includes determining location data including information regarding a location of the second structure relative to the first structure in the underwater environment based on the sensor data, and determining one or more characteristics of the second structure based on the electric field data and the location data.

20 Claims, 13 Drawing Sheets

(51) Int. Cl.
*C23F 13/22* (2006.01)
*G01V 3/08* (2006.01)

(52) U.S. Cl.
CPC ..... *B63B 2211/02* (2013.01); *B63G 2008/005* (2013.01); *C23F 2213/31* (2013.01)

(56) References Cited

OTHER PUBLICATIONS

International Preliminary Report on Patentability for International (PCT) Patent Application No. PCT/IB2019/000375, dated Aug. 6, 2020 9 pages.
International Search Report and Written Opinion for International (PCT) prepared by the European Patent Office for Patent Application No. PCT/IB2019/000375 dated Jul. 3, 2019, 11 pages.
Official Action for Australia Patent Application No. 2019211746, dated Sep. 8, 2023 3 pages.

* cited by examiner

DEVICES, METHODS, AND SYSTEMS FOR UNDERWATER SURVEYING

CROSS REFERENCE TO RELATED APPLICATIONS

This application is a national stage application under 35 U.S.C. 371 of PCT Application No. PCT/IB2019/000375, having an international filing date of Jan. 24, 2019, which designated the United States, which PCT application claims priority to and the benefit of U.S. Provisional Patent Application No. 62/621,486 entitled "Methods and Devices for Protection of Underwater Pipes" filed on Jan. 24, 2018, the entire disclosures of each of which are incorporated by reference herein.

FIELD

Example embodiments are generally directed toward devices, methods, and/or systems for underwater surveying, for example, underwater surveying for cathodic protection.

BACKGROUND

Some metal structures (e.g., fuel pipelines, residential water heaters, bridges, piers, etc.) may employ cathodic protection to suppress corrosion of the structure and extend the life of the structure. Cathodic protection may include placing anodes on the structure to be protected so that the anodes corrode instead of the structure. If the structure is in an underwater environment (e.g., the ocean), assessing the health of the structure and/or the health of the anodes after installation can be time consuming and costly.

BRIEF DESCRIPTION OF THE DRAWINGS

Inventive concepts are described in conjunction with the appended figures, which are not necessarily drawn to scale.

DETAILED DESCRIPTION

Figure 1:
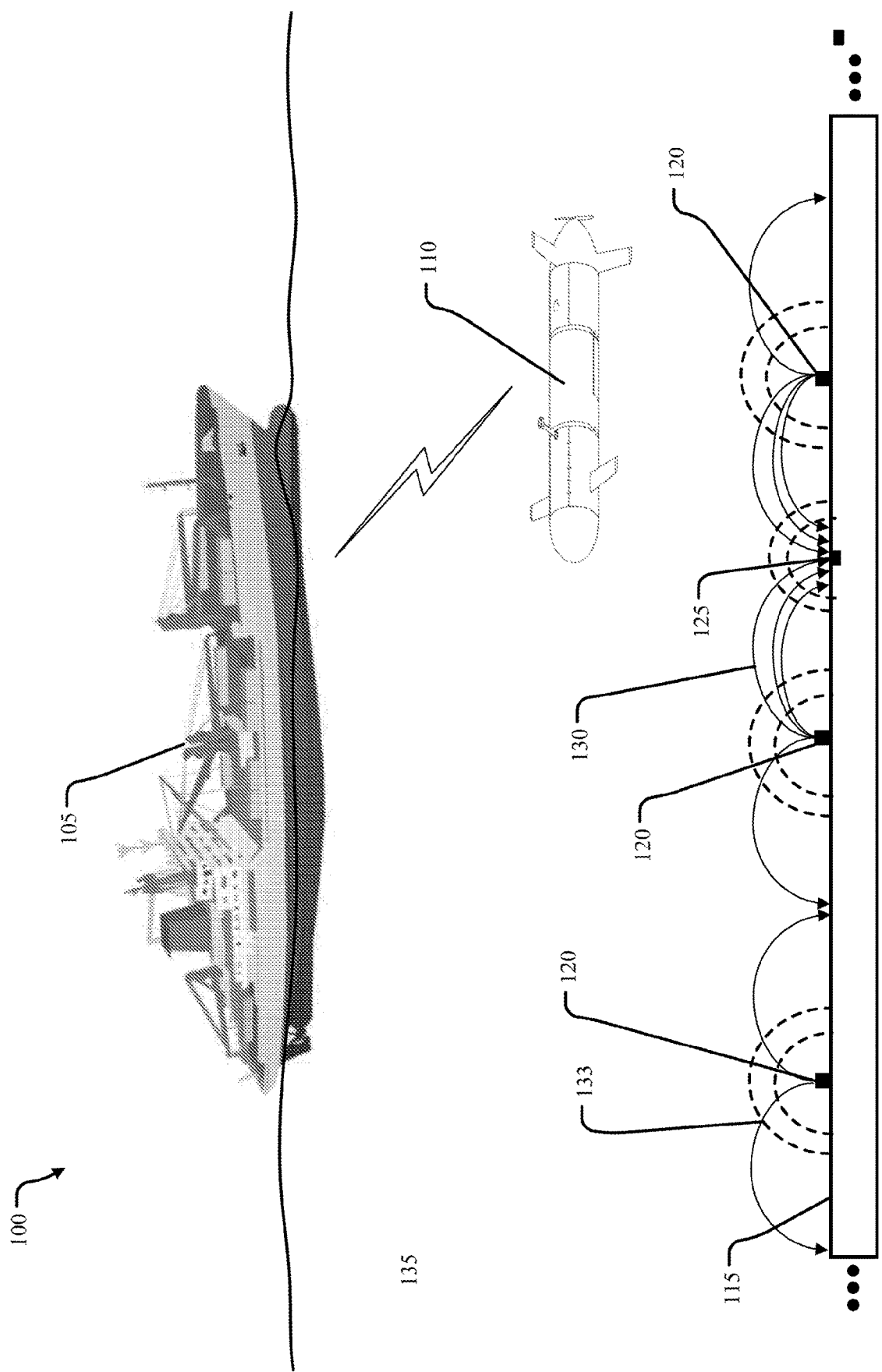
FIG. 1 illustrates a system according to at least one example embodiment.

Related art cathodic protection surveying methods may employ remotely operated underwater vehicles (ROVs) to measure levels of cathodic protection for an underwater structure, such as a pipeline. These methods may include attaching a probe to the ROV, which is then remote controlled to follow the pipe as the probe contacts the pipe to take cathodic protection measurements. The related art methods are limited by the speed of the ROV (about 0.5 m/s), frequent re-calibration needs, substantial processing power post-survey, inaccuracies associated with the probe being misaligned with the pipe, personnel and equipment costs associated with operating the ROV, etc.

At least one example embodiment proposes to address these and other issues with the use an underwater vehicle, such as an ROV or an autonomous underwater vehicle (AUV), that takes contactless electric field measurements at some separation distance from the underwater structure (e.g., 1 m to 10 m). At least one example embodiment combines three-axis electric field (E-field) measurements with a precise relative position to the structure (e.g., pipe), the seafloor shape/properties, and seawater properties to reconstruct the shape of the E-field over the length of the pipeline. In the event that the pipe is protected by anodes, this knowledge allows the estimation of the anode currents themselves as well as currents in the pipe. The computation may be done in real-time on board the AUV or in post processing upon recovery of the AUV. The resulting data may indicate how the anodes are functioning, how much life an anode has remaining, when the anodes should be serviced, etc.

In addition to obtaining information about the anodes, the knowledge of the spatial distribution of the anode currents over the length of the pipe also shows where leakage currents occur in the pipe due to a change in current. Leakage currents in this setting typically result from exposed or corroding metal that is indicative of an inhomogeneity in the pipe.

By moving the underwater vehicle at speeds of three or four knots, the frequency response of the measurements are shifted away from direct current (DC) and allows the use of notch filtering methods which both remove the low frequency drift of the electrodes detecting the electric field and the high frequency noise components caused by other sensors and systems of the underwater vehicle. In addition, by controlling the altitude of the survey, at least some of the undesirable components of the sub-surface geology and cultural artifacts are avoided and/or are removed by filtering.

Still further, using acoustic sensors of the underwater vehicle to track the relative position of the pipe, the underwater vehicle is able to fly at higher altitudes above the pipe than related art systems. This increase in altitude has the effect of removing some of the noise due to the fine grain near surface geological structure in the E-field.

At least one example embodiment also achieves common mode noise cancellation by positioning the electrodes that detect the electric field concentrically around a central axis of the underwater vehicle so that some or all of the vehicle's noise is removed as common mode.

In at least one example embodiment, the electrodes mounted on the underwater vehicle for detecting the electric field are arranged as forward electrodes in a triangle that has a central top electrode and two side electrodes equidistant from the top electrode against the vehicle hull so that both the cross and vertical components of the E-field are measured. Additionally, the vertical field is computed through the difference of the two angled fields and has a resultant dipole distance equal to twice the vertical distance formed by the triangle.

At least one example embodiment allows for removal of the induced electromotive force (e.g., EMF induced by the vehicle). For example, the induced electromotive force may be computed and removed from the electric field measurements through measurement of the magnetic field via self-compensation methods and the measurement of the vehicle's velocities.

At least one example embodiment further removes the induced effects of wave motion. For example, the effects of wave motion are limited to frequencies larger than 0.1 Hz and may be removed through adjustment of a notch filter.

In view of the above and the following, it should be understood that example embodiments may be used for underwater structures that are buried or unburied, for example, buried or unburied pipelines, pylons, etc.

The ensuing description provides example embodiments only, and is not intended to limit the scope, applicability, or configuration of the claims. Rather, the ensuing description will provide those skilled in the art with an enabling description for implementing the described embodiments. It being understood that various changes may be made in the function and arrangement of elements without departing from the spirit and scope of the appended claims.

Various aspects of example embodiments will be described herein with reference to drawings that are schematic illustrations of idealized configurations. As such, variations from the shapes of the illustrations as a result, for example, manufacturing techniques and/or tolerances, are to be expected. Thus, the various aspects of example embodiments presented throughout this document should not be construed as limited to the particular shapes of elements (e.g., regions, layers, sections, substrates, etc.) illustrated and described herein but are to include deviations in shapes that result, for example, from manufacturing. By way of example, an element illustrated or described as a rectangle may have rounded or curved features and/or a gradient concentration at its edges rather than a discrete change from one element to another. Thus, the elements illustrated in the drawings are schematic in nature and their shapes are not intended to illustrate the precise shape of an element and are not intended to limit the scope of example embodiments.

It will be understood that when an element such as a region, layer, section, substrate, or the like, is referred to as being "on" another element, it can be directly on the other element or intervening elements may also be present. In contrast, when an element is referred to as being "directly on" another element, there are no intervening elements present. It will be further understood that when an element is referred to as being "formed" or "established" on another element, it can be grown, deposited, etched, attached, connected, coupled, or otherwise prepared or fabricated on the other element or an intervening element.

Furthermore, relative terms, such as "lower" or "bottom" and "upper" or "top" may be used herein to describe one element's relationship to another element as illustrated in the drawings. It will be understood that relative terms are intended to encompass different orientations of an apparatus in addition to the orientation depicted in the drawings. By way of example, if an apparatus in the drawings is turned over, elements described as being on the "lower" side of other elements would then be oriented on the "upper" side of the other elements. The term "lower" can, therefore, encompass both an orientation of "lower" and "upper" depending of the particular orientation of the apparatus. Similarly, if an apparatus in the drawing is turned over, elements described as "below" or "beneath" other elements would then be oriented "above" the other elements. The terms "below" or "beneath" can therefore encompass both an orientation of above and below.

The phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

Unless otherwise defined, all terms (including technical and scientific terms) used herein have the same meaning as commonly understood by one of ordinary skill in the art to which inventive concepts belong. It will be further understood that terms, such as those defined in commonly used dictionaries, should be interpreted as having a meaning that is consistent with their meaning in the context of the relevant art and inventive concepts.

As used herein, the singular forms "a," "an," and "the" are intended to include the plural forms as well, unless the context clearly indicates otherwise. It will be further understood that the terms "include," "includes," 'including," "comprise," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. The term "and/or" includes any and all combinations of one or more of the associated listed items.

FIG. 1 illustrates a system 100 according to at least one example embodiment. The system 100 includes a surface vessel 105, an underwater vehicle 110 (or vehicle 110), and an underwater structure 115 (or pipe). The underwater vehicle 110 and the underwater structure 115 may be in an underwater environment 135 while the surface vessel 105 floats on top the underwater environment 135. In at least one example embodiment, the underwater environment 135 is seawater (e.g., the ocean). The underwater structure 115 may include a plurality of anodes 120 that provide cathodic protection for the underwater structure 115. As shown, the anodes 120 may emit current to create an electric field 130 (or current flow), illustrated by arrows emitted from each anode 120. The underwater structure 115 may also include one or more faults 125, illustrated as a current sink. In FIG. 1, the underwater structure 115 is depicted as a pipeline, however, example embodiments are not limited thereto, and the underwater structure 115 may be any structure having cathodic protection (e.g., a pylon supporting a bridge, an oil rig, etc.). The potential field 133 for the anodes 120 and the faults 125 is shown by the dashed lines. In general, the underwater structure 115 may have a slight negative charge along its length. Faults 125 may create a concentration of negative charges (or negative sources) as current sinks along the underwater structure 115 while anodes 120 may create a concentration of positive charges (or positive sources) as current sources.

The surface vessel 105 may be a support vessel for the underwater vehicle 110. For example, the surface vessel 105 may deploy and/or retrieve the underwater vehicle 110. Thus, the surface vessel 105 may be boat or ship for research, anode maintenance, and/or other purpose that desires use of the underwater vehicle 110. In at least one example embodiment, the surface vessel 105 and the underwater vehicle 115 are capable of communicating with one another via a wired connection (e.g., via RS-422 for an ROV) or wireless connection (e.g., via acoustics for an AUV). Additionally or alternatively, the surface vessel 105 and the underwater vehicle 110 do not communicate with one another after deployment of the underwater vehicle 110 from the surface vessel 105.

The underwater vehicle 110 may be an AUV or an ROV equipped with a plurality of sensors for performing desired functions, such as detecting the electric field 130, for detecting the presence of the underwater structure 115, for navigating the underwater environment 135, etc. The underwater vehicle 110 may include any desired number of power sources, motors, thrusters, fins, and/or other control mechanisms for guiding the underwater vehicle 110 through the underwater environment 135.

Details of the surface vessel 105 and the underwater vehicle 110 relevant to example embodiments are described in more detail below with reference to FIGS. 2-3C.

Figure 2:
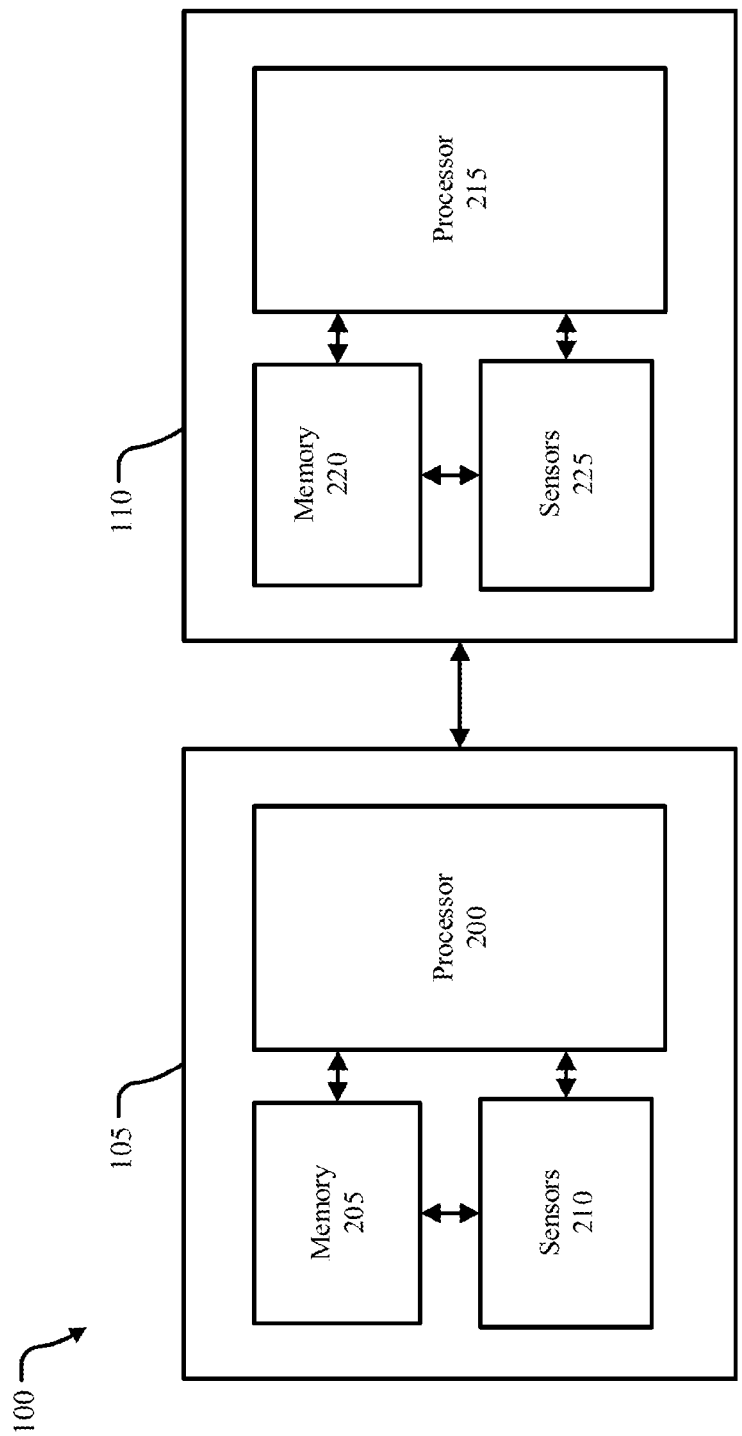
FIG. 2 is a block diagram illustrating additional details of elements in the system of FIG. 1 according to at least one example embodiment.

FIG. 2 is a block diagram illustrating additional details of elements in the system 100 of FIG. 1. In particular, FIG. 2 shows additional details for the surface vessel 105 and the underwater vehicle 110. The surface vessel 105 includes a processor 200, a memory (or computer readable media) 205, and sensors 210. The memory 205 may store instructions for execution by the processor 200 to enable one or more functions of the surface vessel 105 and/or the underwater vehicle 110. The memory 205 may further store information collected by sensors 210. The processor 200 may process information stored by the memory 205. The sensors 210 include any sensors desired to assist with operating the surface vessel 105 and/or the underwater vehicle 110 (navigation sensors, RADAR, sonar, global positioning system (GPS) sensors, motor sensors, etc.). According at least one embodiment, the sensors 210 include an acoustic positioning system, such as an ultra-short baseline (USBL) system, for tracking a position of the underwater vehicle 110.

The processor 200 may correspond to one or many computer processing devices. For instance, the processor 200 may be provided as silicon, as a Field Programmable Gate Array (FPGA), an Application-Specific Integrated Circuit (ASIC), any other type of Integrated Circuit (IC) chip, a collection of IC chips, a microcontroller, a collection of microcontrollers, or the like. As a more specific example, the processor 200 may be provided as a microprocessor, Central Processing Unit (CPU), or plurality of microprocessors that are configured to execute the instructions sets stored in memory 205. Upon executing the instruction sets stored in memory 205, the processor 200 enables various functions of the surface vessel 105 and/or the underwater vehicle 110.

The memory 205 may include any type of computer memory device or collection of computer memory devices. The memory 205 may be volatile or non-volatile in nature and, in some embodiments, may include a plurality of different memory devices. Non-limiting examples of memory 205 include Random Access Memory (RAM), Read Only Memory (ROM), flash memory, Electronically-Erasable Programmable ROM (EEPROM), Dynamic RAM (DRAM), etc. The memory 205 may be configured to store instruction sets in addition to temporarily storing data for the processor 200 to execute various types of routines or functions.

As shown in FIG. 2, the underwater vehicle 110 includes a processor 215, a memory (computer readable media) 220, and sensors 225. The processor 215 and the memory 220 may be implemented in the same or similar manner as processor 200 and memory 205.

For example, the processor 215 may correspond to one or many computer processing devices. For instance, the processor 215 may be provided as silicon, as a Field Programmable Gate Array (FPGA), an Application-Specific Integrated Circuit (ASIC), any other type of Integrated Circuit (IC) chip, a collection of IC chips, a microcontroller, a collection of microcontrollers, or the like. As a more specific example, the processor 215 may be provided as a microprocessor, Central Processing Unit (CPU), or plurality of microprocessors that are configured to execute instructions sets stored in memory 220. Upon executing the instruction sets stored in memory 220, the processor 215 enables various functions of the underwater vehicle 110.

The memory 220 may include any type of computer memory device or collection of computer memory devices. The memory 220 may be volatile or non-volatile in nature and, in some embodiments, may include a plurality of different memory devices. Non-limiting examples of memory 220 include Random Access Memory (RAM), Read Only Memory (ROM), flash memory, Electronically-Erasable Programmable ROM (EEPROM), Dynamic RAM (DRAM), etc. The memory 220 may be configured to store instruction sets in addition to temporarily storing data for the processor 215 to execute various types of routines or functions.

The sensors 225 may include any known sensors desired for enabling the underwater vehicle 110 to perform surveying of an underwater environment (e.g., cathodic protection surveying). For example, the sensors 225 may include one or more sensors for tracking the underwater structure 115 while the underwater vehicle 110 is in the underwater environment 135. Such sensors may include one or more cameras (visible light or infrared), multi-beam echosounders, profiling lasers, LIDAR scanners, etc.

As shown in FIG. 2, the surface vessel 105 and the underwater vehicle 110 may be configured to communicate with one another via any known wired or wireless connection/interface. Such communication may allow two-way exchange of information between the surface vessel 105 and the underwater vehicle 110. For example, the communication may enable the processor 200 to program the memory 220 with instructions for surveying the underwater environment 135. In another example, the communication may enable the processor 215 to send information collected by the sensors 225 during an underwater trip to the surface vessel 105 for further processing.

Although not shown, the surface vessel 105 and/or the underwater vehicle 110 may include one or more user interfaces that allow user input. The user interface(s) may be electrical, mechanical, and/or graphical in nature.

Further, although the processor 200 and memory 205 are shown as being part of the surface vessel 105, it should be understood that these elements may be separate from and/or removable from the surface vessel 105. For example, in at least one example embodiment, processor 200 and memory 205 are part of an on-shore pre-surveying/post-surveying system for the underwater vehicle 110. In this case, information collected by sensors 210 that is relevant to a survey taken by the underwater vehicle may be stored on the memory 205 at some time after the survey but before processing.

Figure 3A:
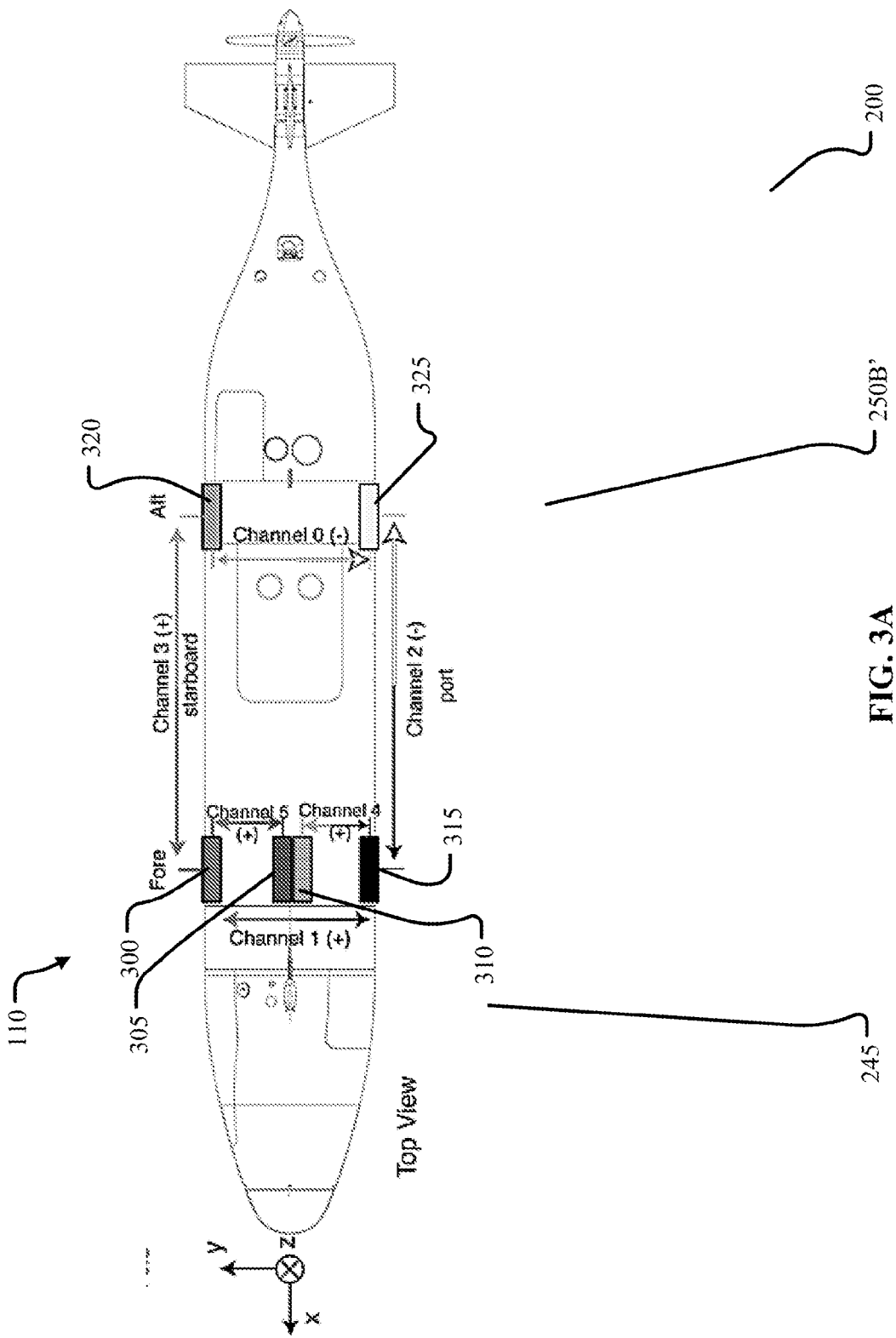
FIG. 3A illustrates a top view of the underwater vehicle from FIG. 1 according to at least one example embodiment.
Figure 3B:
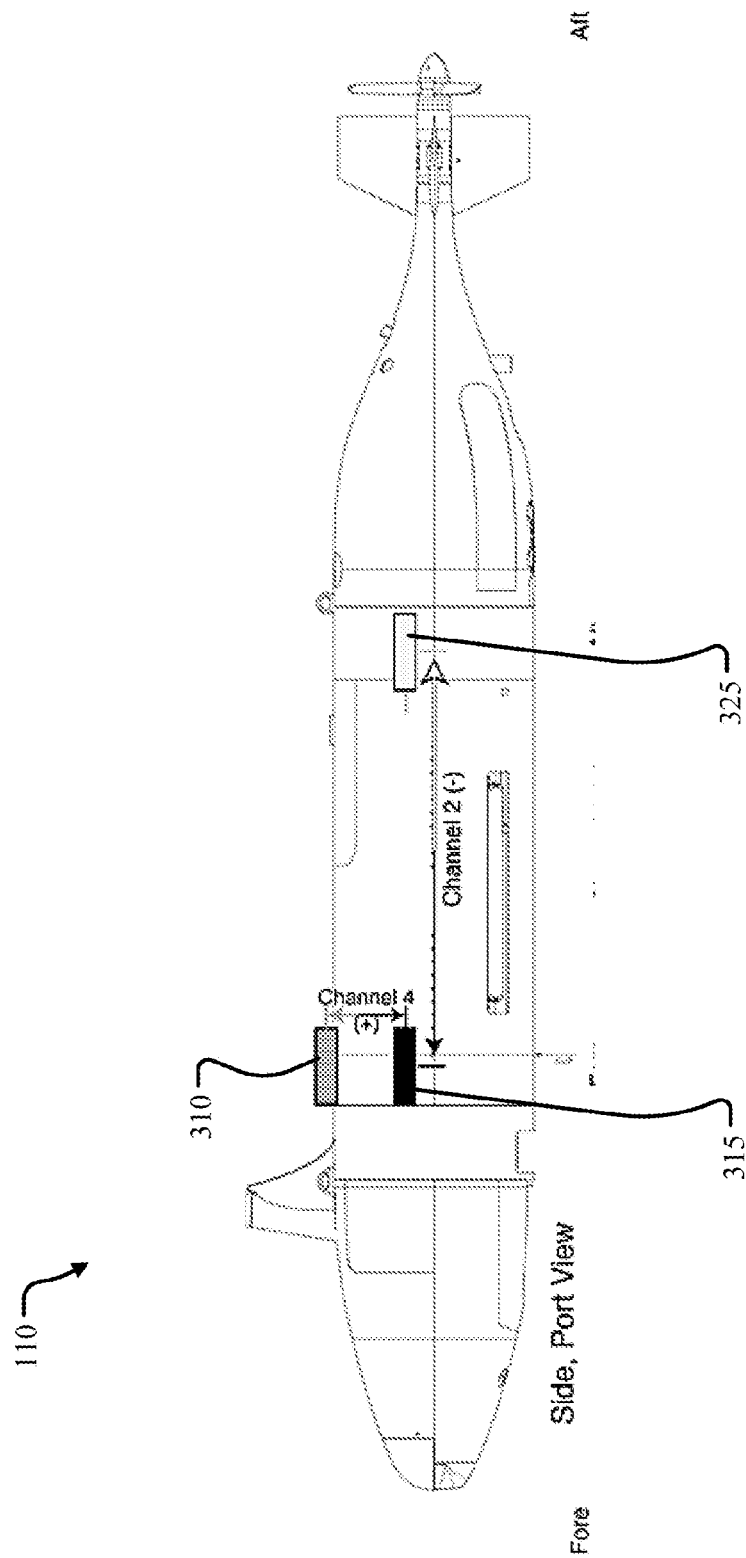
FIG. 3B illustrates a side view of the underwater vehicle from FIG. 1 according to at least one example embodiment.
Figure 3C:
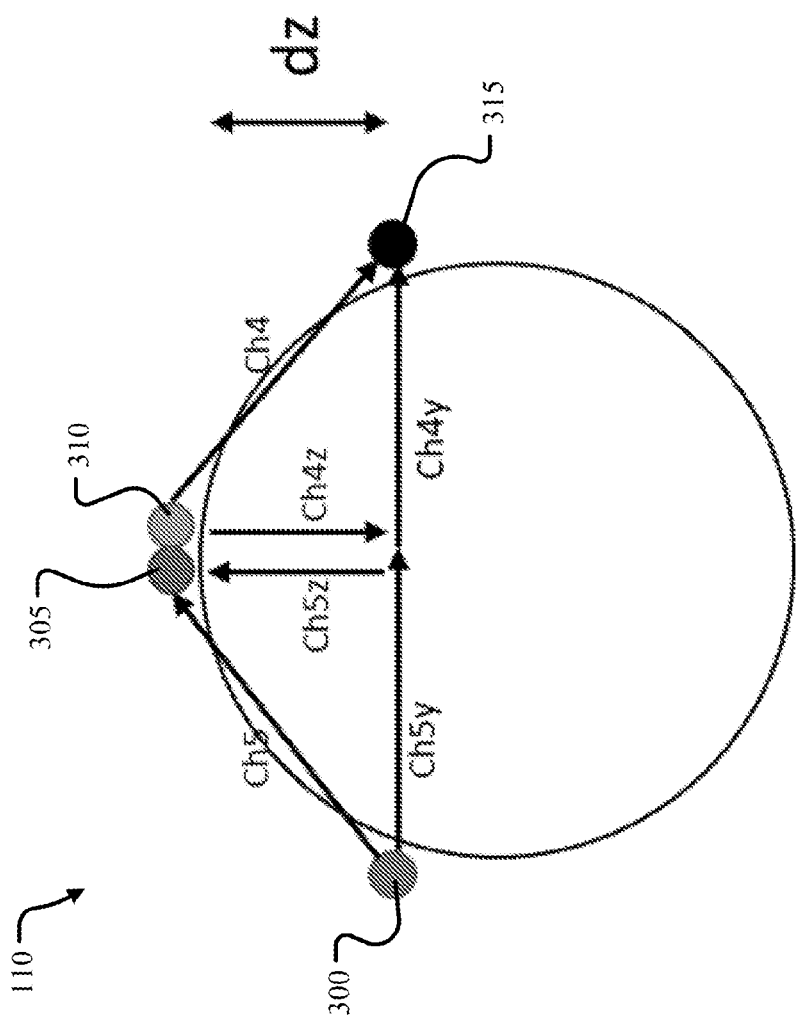
FIG. 3C illustrates a front view of the underwater vehicle from FIG. 1 according to at least one example embodiment.

FIGS. 3A-3C illustrate various views of the underwater vehicle 110 in FIG. 1. For example, FIG. 3A illustrates a top view of the underwater vehicle 110 from FIG. 1, FIG. 3B illustrates a side view of the underwater vehicle 110, and FIG. 3C illustrates a front view of the underwater vehicle 110.

In more detail, FIGS. 3A-3C shows an arrangement of a plurality of electrodes 300, 305, 310, 315, 320, and 325 mounted on the underwater vehicle 110. The plurality of electrodes 300, 305, 310, 315, and 325 may be part of the sensors 225 of the underwater vehicle 110. The plurality of electrodes 300, 305, 310, 315, and 325 are used for detecting an electric field or electric field gradient in the underwater environment 135. As made clear by FIGS. 3A-3C, electrodes 300 and 320 are mounted to one side (starboard side) of the underwater vehicle 110, electrodes 315/325 are mounted to another side (port side) of the underwater vehicle, and electrodes 305/315 are mounted to a top of the underwater vehicle 110. As shown, electrodes 300/305/310/315 are mounted on a fore of the underwater vehicle 110 and substantially aligned with one another in a y-direction while electrodes 320/325 are mounted on an aft of the underwater vehicle 110 and substantially aligned with one another in the y-direction. Electrodes 300 and 320 may be aligned with one another in an x-direction while electrodes 315 and 325 are also aligned with one another in the x-direction. As shown, electrodes 305 and 310 may be adjacent to one another on the top of the underwater vehicle 110. The plurality of electrodes 300, 305, 310, 315, and 325 may be mounted to an outer surface of the underwater vehicle 110 or mounted on extension parts that separate the electrodes from the outer surface of the underwater vehicle 110 so long as the general arrangement shown in FIGS. 3A-3C is maintained. Although not explicitly shown, other configurations of electrodes are possible and within the scope of inventive concepts.

As shown in FIGS. 3A-3C, the plurality of electrodes 300, 305, 310, 315, and 325 create a plurality of channels 0 to 5 for measuring an electric field or electric field gradient.

Inventive concepts regarding electric field measurement, anode health, and underwater structure health will now be described.

At least one example embodiment employs accurate measurements of the electric field or electric field gradient, as measured by the underwater vehicle 110 which is traversing the length of the underwater structure 115, to determine the magnitude and/or spatial distribution of cathodic protection currents in the underwater structure 115. The use of an underwater vehicle 110 according example embodiments for this service has the advantage of lower overall costs for the survey due to the higher survey speed and reduced vessel and personnel requirements when compared to related art methods.

Figure 4A:
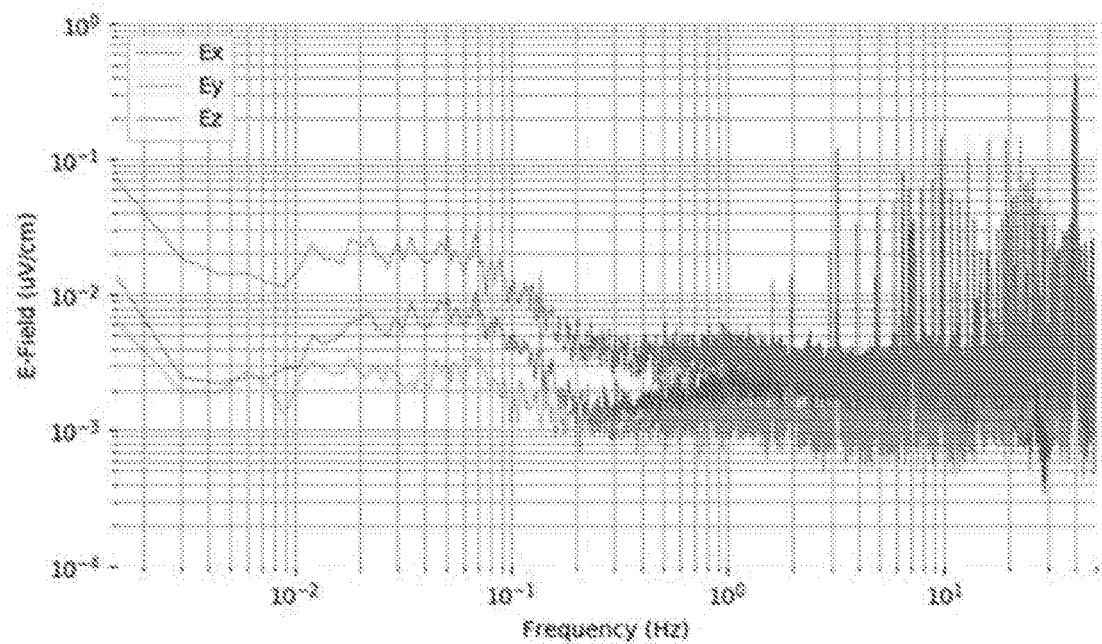
FIG. 4A illustrates an example spectra according to at least one example embodiment.
Figure 4B:
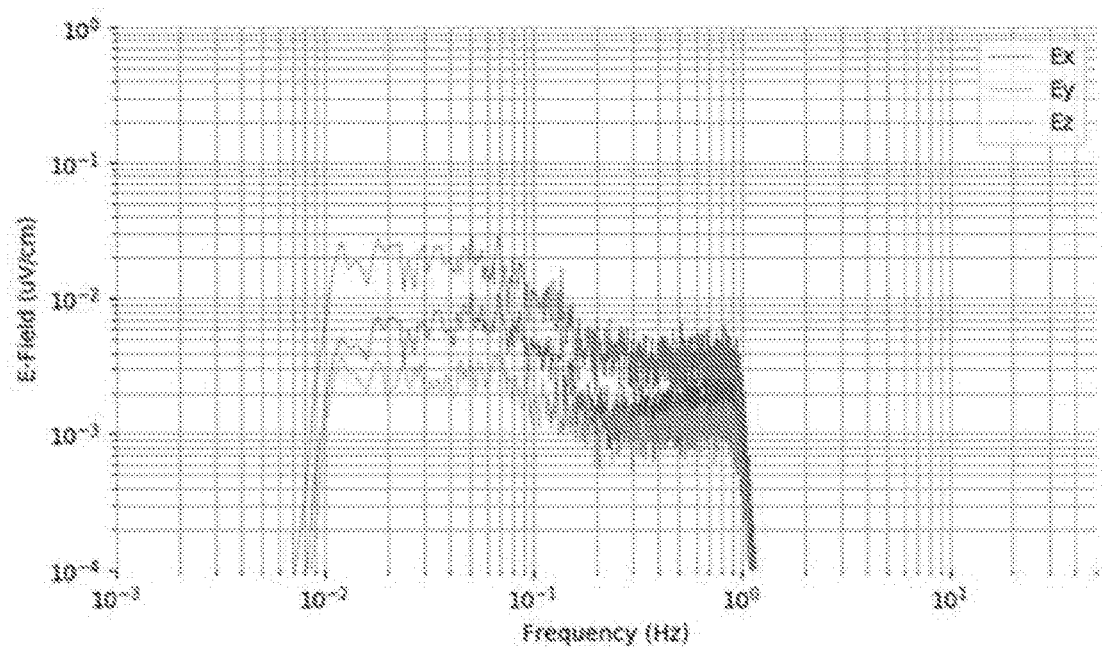
FIG. 4B illustrates an example spectra of FIG. 4A that has been filtered according to at least one example embodiment.

FIGS. 4A and 4B illustrate the removal of such frequencies as most of the sensor noise is above 1 Hz. Indeed, FIG. 4A illustrates an electric field amplitude spectra with x, y, and z components measured by the electrodes 300, 305, 310, 315, and 325 while the underwater vehicle 110 is surveying the underwater structure 110 with all other systems and sensors active. Meanwhile, FIG. 4B illustrates an electric field amplitude spectra with x, y, and z components that has been filtered compared to FIG. 4A, by for example, a frequency filter.

Electric Field Measurements

An element to enabling the estimation of the cathodic protection currents according to example embodiments is the low noise electric field or electric field gradient measurement which is located both relative to the underwater structure 115 and relative to a geographic reference frame through use of the onboard vehicle 110 systems and sensors 2255. This low noise of the electric field gradient measurements is enabled through a combination of factors, discussed below.

A first enabling factor of the low noise characteristics of the underwater vehicle 110 electric field gradient measurement relates to the use of low noise electrodes 300, 305, 310, 315, and 325 which are suited for a marine environment. These electrodes may employ Ag/AgCl chemistry, are non-polarizing, and have a low noise floor. Additionally, a raw difference measurement is passed through low noise analog amplification and subsequent digitization at a sampling rate sufficient to determine the principal noise components due to the underwater vehicle 110 systems (motors, sensors, etc.).

A second enabling factor of the low noise characteristics of the underwater vehicle 110 electric field gradient measurement is the characteristics of the self-noise of the underwater vehicle 110 platform. The underwater vehicle 110 has many electric field sources with electrical currents and voltages used for the various sonar systems and actuators on board the vehicle 110. To mitigate these effects, inventive concepts take advantage of the fact that these systems are, in many cases, located along or near a single axis of the underwater vehicle 110 of the streamlined cylindrical shape of the body. As a result the electrical field due to these systems is substantially symmetrical, and by arranging the electrodes 300, 305, 310, 315, and 325 around the underwater vehicle 110 (as shown in FIGS. 3A-3C, for example), the noise from the vehicle systems is experienced as a common mode signal. Since common mode signals are substantially rejected in differential measurements, the majority of the self-noise from the vehicle 110 is rejected. The remaining signal from the vehicle 110 is due to asymmetries in wiring and sensor placement which cause the electrical field due to those systems to not be common mode. However, these remaining signal components are at frequencies which may be at least an order of magnitude higher than the signals of interest due to the cathodic protection currents, and are therefore removable.

A third enabling factor of the low noise characteristics of the underwater vehicle 110 electric field gradient measurement is the based on the motion of the underwater vehicle 110. In related art systems, measurements are made at DC with the vehicle moving at speeds of 0.5 m/s or less. These systems require periodic calibrations to a remote electrode to remove the DC bias that builds up over time due to low frequency drift of the measurement. By contrast, an underwater vehicle 110 according to example embodiments moves at speeds of around 2.0 m/s through a relatively static field due to the cathodic protection currents in the underwater structure 115. This static field may not be spatially uniform, and may increase in magnitude near the anodes 120 and decrease to a minimum at the midpoint between adjacent anodes 120 (assuming no faults). As the anodes 120 are usually uniformly spaced along the underwater structure 115, the speed of the underwater vehicle 110 through the static field determines the frequency components of the signal due to the cathodic protection currents. At a speed of 2.0 m/s and assuming a relatively common anode spacing of 150 m, for example, the anode passing periodicity will be around 75 seconds. Electric field measurements according to example embodiments may therefore be considered a periodic signal with a center frequency due to the anode spacing and vehicle speed. This periodic signal is illustrated in FIG. 4A by the bump in the spectra between 1 Hz and 0.01 Hz.

The unwanted frequency components may be removed through filtering as illustrated in FIG. 4B.

A fourth enabling factor of the low noise characteristics of the underwater vehicle 110 electric field gradient measurement is the removal of the induced electromotive force (IEMF). The IEMF may be represented in equation form as the sum of the cross product of the velocity of the underwater vehicle 110 and magnetic field and the time rate of change of the magnetic field. Equation 1:

$$IEMF = v \times B + \frac{\delta B}{\delta t} \quad (1)$$

For the purposes of this example, there is not a time varying magnetic field and therefore this term is neglected, leaving only the velocity cross magnetic field term. By measuring both the magnetic field and velocity, it is possible to therefore estimate the IEMF. Due to the vehicle's 110 proximity to the underwater structure 110, a large piece of steel or other metal, which can have residual magnetizations, the IEMF can be significant enough that the signal should be accounted for to avoid false positives in determining anode responses. IEMF removal is useful because in order to scale the E-field signal to a common datum above the underwater structure 115, the E-field signal is converted to a radial field component in the underwater structure 115 frame of reference. This radial component contains both the vertical and cross field components. The primary direction of motion of the vehicle 110 is considered to be forward, which in the North, East, Down frame of reference is the x component. When taking the cross product of the velocity in the x direction with an anomalous B-field, the resultant will be in the y-z plane, the components of which are used to compute the radial E-field. This is shown by expanding the cross product in Equation 2:

$$v \times B = (v_y B_z - v_z B_x)i - (v_x B_z - v_z B_x)j + (v_x B_y - v_y B_x)k \quad (2)$$

Assuming that the velocities in z and y are negligible, then Equation 3:

$$v \times B \approx -(v_x B_z)j + (v_x B_y)k \quad (3)$$

Figure 5:
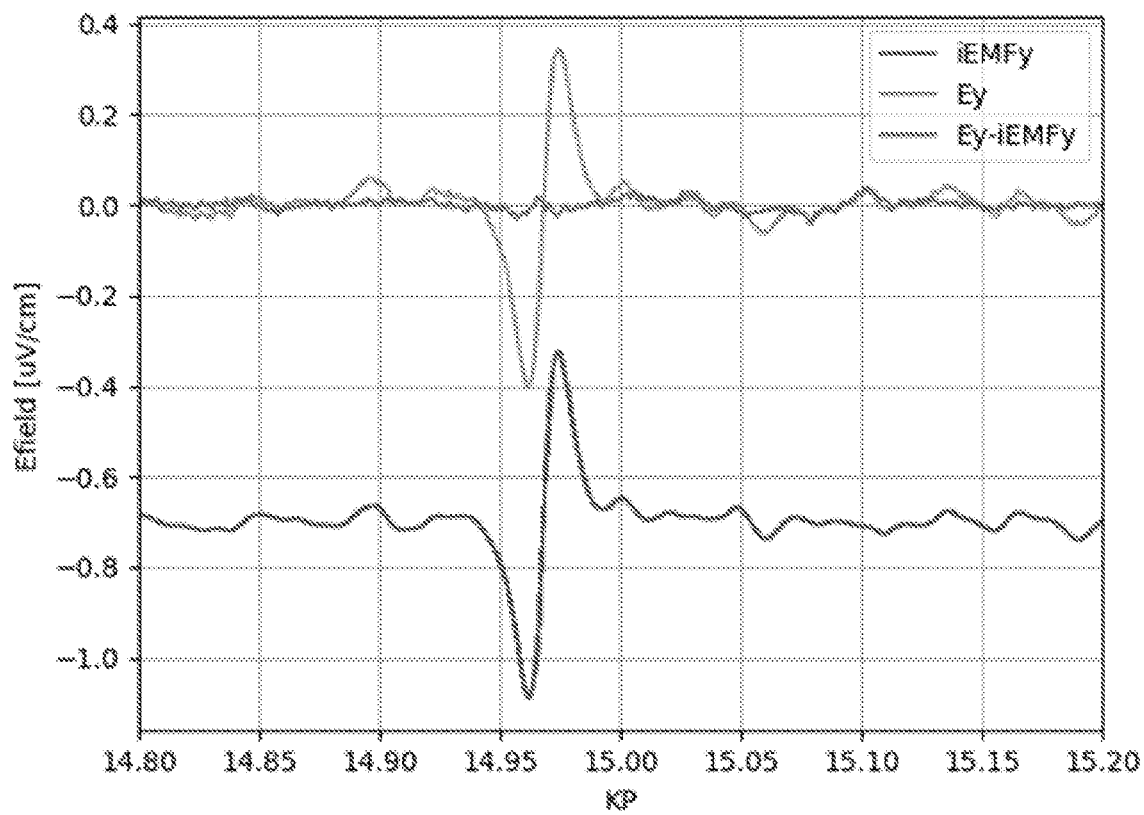
FIG. 5 illustrates a graph showing the removal of induced electromotive force from a cross E-field with the DC bias also removed according to at least one example embodiment.

In Equation 3, i, j, k are the unit vectors in the x, y, z directions, respectively. FIG. 5 illustrates the removal of induced EMF from the cross E-field with the DC bias also removed.

A fifth enabling factor of the low noise characteristics of the underwater vehicle 110 electric field gradient measurement is the use of non-orthogonal electrode locations to form derived component fields (as shown in FIGS. 3A-3C). Part of vehicle's 110 operations is the launch and recovery of the system from a vessel or shore. While being deployed or recovered from a vessel, the vehicle 110 will often make use of cranes, launch and recovery systems, A-frames and other shipboard equipment that make mounting electrodes 300 to 325 to the exterior of the vehicle 110 hazardous. To reduce the impact of the electrode placement on the shipboard operations, the electrodes 300 to 325 may be placed in locations which do not interfere with the lines, harnesses, gantries and sleds. For example, as shown in FIGS. 3A to 3C, the electrodes 300 to 325 are arranged on the top of the vehicle 110. In this arrangement there is no direct measurement of the vertical electric field. Rather the vertical E-field forms a component of the 4th and 5th Channel as shown in FIG. 3C. To form the vertical measurement in this arrangement, the symmetry of the electrodes is exploited allowing the vertical measurement to be computed by taking the difference of Channel 5 and 4, as shown in Equations 4 and 5:

$$Vz = Ch5 - Ch4 \quad (4)$$

$$Vz = (Ch5yj + Ch5zk) - (Ch4yj - Ch4zk) \quad (5)$$

Since the components of Channel 5 and Channel 4 in the y direction are equal, they cancel out and the difference results in a vertical E-field or voltage measurement only. Additionally, in this manner, the vertical dipole component is applied to the vertical component of Channel 5 and Channel 4, effectively doubling the vertical dipole distance, as shown in Equation 6:

$$E_z = \frac{[(Ch5zk) - (-Ch4zk)]}{2dzk} = \frac{Vz}{2d_z} \quad (6)$$

Localization, Coordinate Frames, and Transformations

Inventive concepts related to the calculation/estimation of the cathodic protection currents in the underwater structure 115 include the accurate navigation of the vehicle 110 in the geographic reference frame, knowledge of the relative location of the underwater structure 115 with respect to the vehicle 110, and/or measurement of the electric field or potential field gradient in three dimensions. These concepts are discussed in more detail below.

The accurate navigation of the vehicle 110 in the geographic frame of reference is desired to locate the measurements for comparison with prior surveys, for re-visiting sites of interest, and/or to locate the along pipe distance of the measurements commonly referred to as kilometers of pipe (KP). This accurate global navigation is enabled by fusing high quality data from an inertial navigation system onboard the vehicle 110 with acoustic USBL measurements of the vehicle's 110 position collected by the nearby tending support vessel 105. When in range of the USBL, the horizontal uncertainty in the vehicle 110 navigation system may be between about 0.4 and about 4.0 meters depending on water depth, water properties, and the specific USBL system being used.

The localization of the underwater structure 115 relative to the vehicle 110 is desired to reconstruct the shape of the electric field surrounding the underwater structure 115 from the E-field measurements, and is separate from the navigation in the geographic reference frame. The relative position and orientation of the underwater structure 115 with respect to the vehicle 110 may be derived in post-processing from the output of a multi-beam echosounder, a camera, a profiling laser scanner, and/or LIDAR scanner. The vehicle's 110 proximity to the underwater structure 115, around three to ten meters during data collection, enables this relative localization to be measured with a high accuracy.

The primary contributors to the error in the relative position estimate are variations in the speed of sound between the vehicle 110 and the underwater structure 115, resolution of the acoustic and image sensors and modelling errors in the camera calibration, and other unmodeled sources of acoustic error. Since the vehicle 110 is relatively close to the underwater structure 115, the variation in sound speed between the two entities should be minimal, for example, on the order of several 10s of cm/s. With a nominal sound speed of about 1500 m/s, this results in an error of around 0.05% or less. Thus, for a distance of ten meters, the error due to unmodeled sound speed variations is less than a centimeter. Similarly, at a range of ten meters from the underwater structure 115, a multi-beam echo-sounder and a camera both have a resolution of less than one centimeter. The remaining error terms are generally considered to be much less than either of these contributions.

The relative location of the underwater structure 115 to the vehicle 110 at any given moment may then be used to both scale the E-field measurements to a common radial distance and to estimate the electrical currents emitted from the underwater structure 115. First, it is desired to rotate the measured E-fields from the vehicle 110 frame of reference to the underwater structure 115 frame of reference, as in Equation 7 where the vehicle 110 is an AUV and the underwater structure 115 is a pipe:

$$E_{pipe} = R_{pipe}^{AUV} E_{AUV} \quad (7)$$

In Equation 7, $R_{pipe}^{AUV}$ is the rotation matrix from the AUV 110 frame of reference to the pipe frame of reference. This rotation uses the relative angles between the AUV 110 and pipe 115 for which the pipe location must be known relative to AUV 110. Once in the pipe frame of reference, the E-fields may be transformed to a cylindrical coordinate system, as in Equations 8-10:

$$E_r = E_y j + E_z k \quad (8)$$

$$E_\theta = \tan^{-1} \frac{E_y j}{E_z k} \quad (9)$$

$$E_h = E_x i \quad (10)$$

Figure 6:
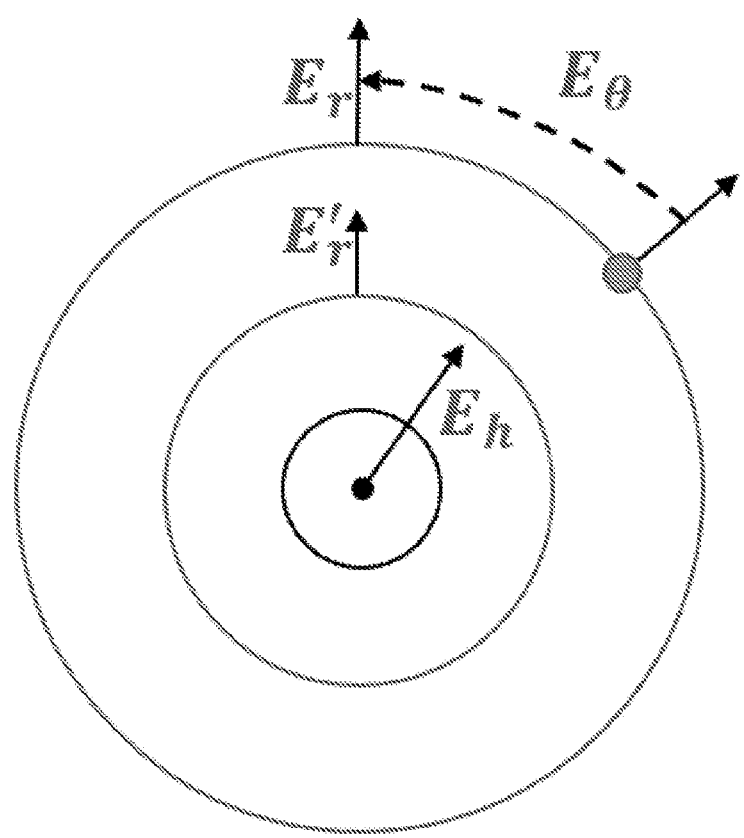
FIG. 6 illustrates radial electric field components according to at least one example embodiment.

In Equations 8-10, $E_r$ is the radial component, $E_\theta$ is the angular component defining the direction of the radial component, and $E_h$ is the along pipe component. The radial component $E_r$ is then able to be transformed to a common datum above of the pipe 115, assuming a cylindrical shape of the electrical field from the pipe 115 as illustrated in FIG. 6, and noted below in Equation 11:

$$E_r' = E_r \left(\frac{r}{r'}\right)^2 \quad (11)$$

Computation of Anode Currents

Inventive concepts related to the calculation of anode currents will now be discussed.

As the seawater conductivity is measured, inventive concepts can estimate the current density from the anodic protection system, both the current flowing from an anode 120 when the vehicle 110 is nearby, and the current flowing from the underwater structure 115 away from the anode 120. This leads to the calculation of the current being emitted by the current source (i.e., the anode 120) given certain geometrical assumptions. This calculation is may serve as a basis for estimating the health of the anode 120 or underwater structure 115.

To estimate the cathodic protection currents in an underwater structure 115, the E-Field is measured by electrodes 300 to 325. These field components may also be analytically represented by Equations 12-14:

$$E_{Ax} = J_{Asp} \frac{d_x - d_A}{r_A} \sigma_{sw}^{-1} \quad (12)$$

$$E_{Ay} = J_{Asp} \frac{d_y}{r_A} \sigma_{sw}^{-1} \quad (13)$$

$$E_{Az} = J_{Asp} \frac{d_z}{r_A} \sigma_{sw}^{-1} \quad (14)$$

In Equations 12-14, $E_{Ax}$, $E_{Ay}$, $E_{Az}$ are the idealized electric field measurements due to anodes in cartesian coordinates, the seawater conductivity is $\sigma_{sw}$, and the distance components to the underwater structure 115 is $d_y$, $d_z$. It should be appreciated that when the measurement is taken directly above the anode 120, the $E_{Ay}$ term is zero and the $E_{Az}$ is equal to the radial component in cylindrical coordinates. Further, here the $d_x$ term refers to the along pipe distance, $d_A$ the distance to the anode, and $r_A$ refers to the radial distance from the anode 120 to the measurement location. In this representation, the anode distances are always to the closest anode 120. Equation 15 gives $r_A$:

$$r_A = [(d_x - d_A)^2 + d_y^2 + d_z^2]^{0.5} \quad (15)$$

The spherical current density due to the anode 120 in the underwater structure 115, $J_{Asp}$, is computed through the quotient of the anode current $i_A$ with the spherical surface area of a sphere centered on the anode 120 with radius equal to the radial distance from the anode 120 to the measurement location. $J_{Asp}$ is computed through Equation 16:

$$J_{Asp} = i_A (4\pi r_A^2)^{-1} \quad (16)$$

The anode current is then estimated as the product of the anode spacing $d_s$ with the anode current density $J_A$ and, in cases where the underwater structure 115 is a pipe, the pipe circumference as shown in Equation 17:

$$i_A = d_s J_A 2\pi r_p \quad (17)$$

In Equation 17, $r_p$ is the pipe radius.

In this framework, the along pipe distance $d_x$, cross track distance $d_y$, vertical distance $d_z$ and seawater conductivity $\sigma_{sw}$ are also measured. The pipe radius $r_p$ is known, which leaves the along pipe distance to the anode $d_A$, the anode spacing $d_s$ and the anode current density $J_{Asp}$ as parameters to estimate. Since there are three equations and three unknowns, the system is solvable.

However, the problem may be further simplified by assuming the vertical distance dz to the anode 120 is equal to the radial distance $r_A$ to the anode 120. Then, by using the radial E-field component $E_r$, the anode output current can be computed as in Equations 18 and 19:

$$r_A = d_z \quad (18)$$

$$i_A = E_r 4\pi r_A^2 \sigma^{-1} \quad (19)$$

In the case where the underwater structure 115 is a pipe, the pipe 115 is not usually suspended in the mid-water column but arranged on the seafloor, which has a resistivity different from seawater the measured electric fields. Accordingly, inventive concepts may correct for this effect. Here, the scenario is able to be modelled as a half space problem where the pipe 115 lies in the middle with the seawater above and the seafloor below, each having their own resistivity. The E-field measurements which are uncorrected for these effects are consistent with a full space model in which the pipe 115 is in an environment with a uniform resistivity. To correct the E-field measurements to a half space, the measurements are divided by the seabed amplification factor (SAF), as in Equations 20-22:

$$SAF = 1 + \frac{R_{sf} - R_{sw}}{R_{sf} + R_{sw}} \quad (20)$$

$$R_{sw} = \frac{1}{\sigma_{sw}} \quad (21)$$

$$E_{r_{halfspace}} = \frac{E_r}{SAF} \quad (22)$$

Figure 7:
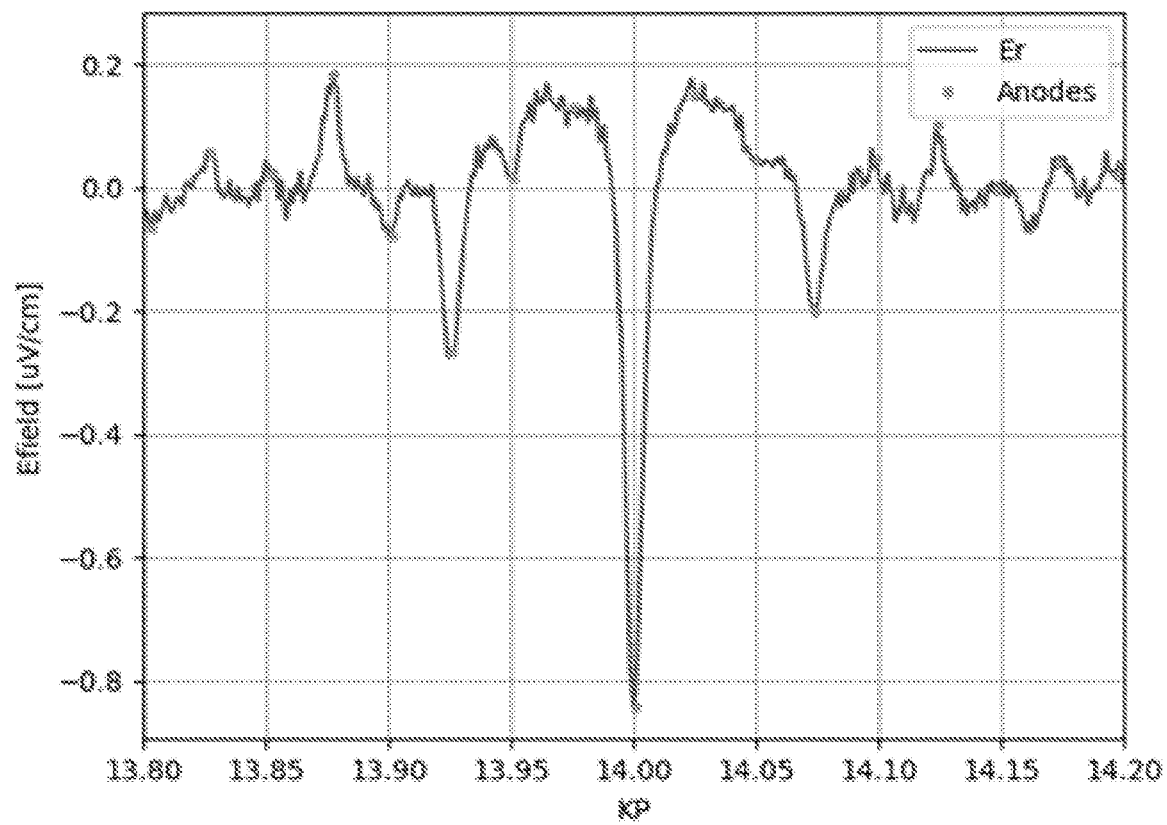
FIG. 7 illustrates a graph of an example radial E-field from anodes according to at least one example embodiment.
Figure 8A:
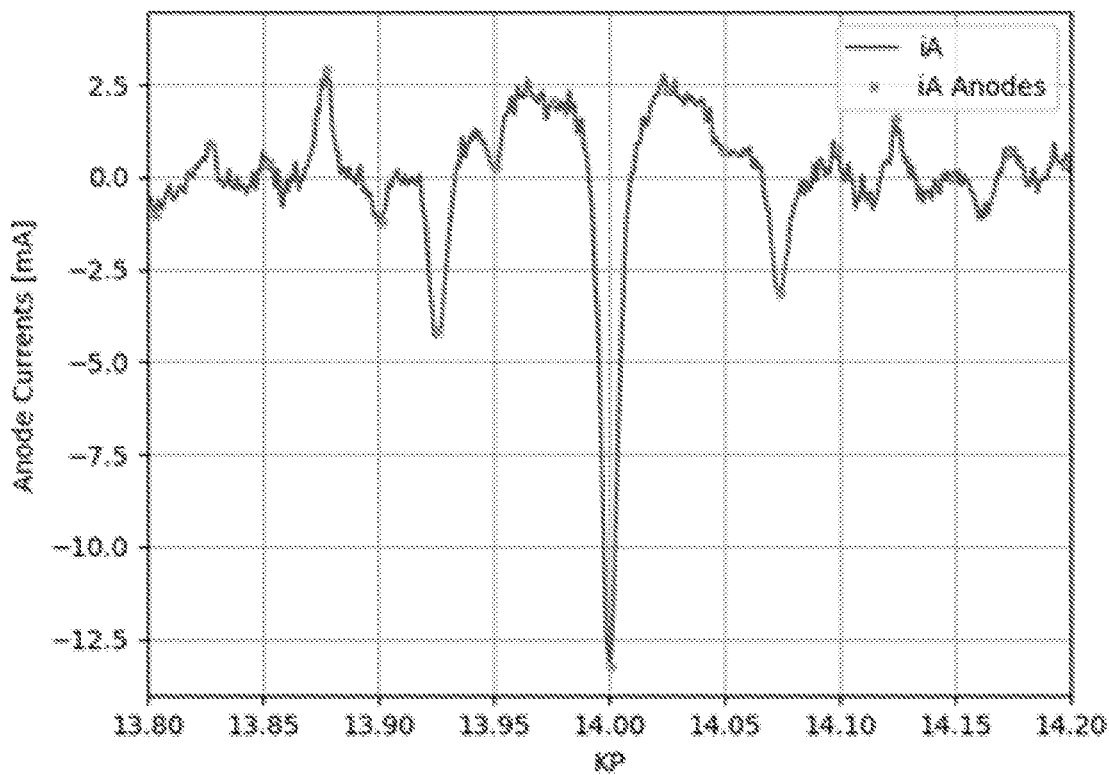
FIG. 8A illustrates a graph of example anode currents in full space according to at least one example embodiment.
Figure 8B:
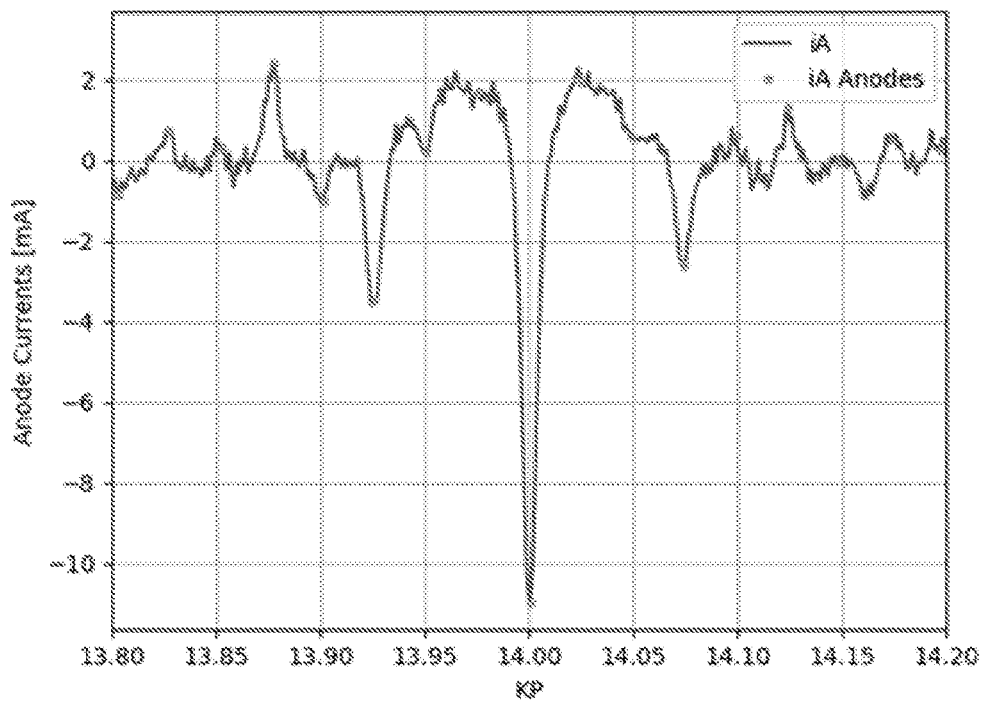
FIG. 8B illustrates a graph of example anode currents in half-space according to at least one example embodiment.

The seafloor resistivity may range in value from being more or less equal to seawater in very loose sediments or clays to thousands of Ohms in the case of very resistive sediments or rock. Taking the limits, the SAF can take values ranging from 1 to 2 which results in the measured radial field being an upper limit and half the radial field being a lower limit. Typical values for seafloor resistivities will range from 0.5 Ohms up to several Ohms resulting in a 10-20% reduction in radial field values. FIG. 7 illustrates an example radial E-field from anodes 120 at about five meters from a top of the pipe 115. FIG. 8A illustrates example anode currents in full space while FIG. 8B illustrates anode currents in half-space where seafloor resistivity is assumed to be 0.5 Ohms.

Leakage Currents

Inventive concepts relating to detection of leakage currents within the underwater structure 115 and assessment thereof will now be described.

Damage or faults 125 in the underwater structure 115 can result in new electrical cells forming that cause electrical leakage currents which act to modify the cathodic protection current from the anodes 120. These leakage currents result in an additional electric field source centered at a fault location $d_F$ with an amplitude proportional to the leakage current $i_F$. Equations 23-25 show the E-field components caused by leakage current:

$$E_{Fx} = J_{Fsp} \frac{d_x - d_F}{r_F} \sigma_{sw}^{-1} \quad (23)$$

$$E_{Fy} = J_{Fsp} \frac{d_y}{r_F} \sigma_{sw}^{-1} \quad (24)$$

$$E_{Fz} = J_{Fsp} \frac{d_z}{r_F} \sigma_{sw}^{-1} \quad (25)$$

In Equations 23-25, $r_F$ is the radial distance to the fault 125 and $J_{Fsp}$ is the spherical current density due to the fault 125. $r_F$ and $J_{Fsp}$ may be computed by Equations 26 and 27:

$$r_F = [(d_x - d_F)^2 + d_y^2 + d_z^2]^{0.5} \quad (26)$$

$$J_{Fsp} = i_F (4\pi r_F^2)^{-1} \quad (27)$$

The electric field at any point along the underwater structure 115 is the sum of all of the electric field sources, as in Equations 28-30:

$$E_x = \Sigma E_{Ax} + \Sigma E_{Fx} \quad (28)$$

$$E_y = \Sigma E_{Ay} + \Sigma E_{Fy} \quad (29)$$

$$E_z = \Sigma E_{Az} + \Sigma E_{Fz} \quad (30)$$

Here, the gradients of the closest anode 120 are assumed to be dominant and the other gradients of other anodes 120 are neglected, which simplifies Equations 28-30 to Equations 31-33:

$$E_x = E_{Ax} + \Sigma E_{Fx} \quad (31)$$

$$E_y = E_{Ay} + \Sigma E_{Fy} \quad (32)$$

$$E_z = E_{Az} + \Sigma E_{Fz} \quad (33)$$

Using Linear Inversion to Estimate Current Source Locations

To solve for the locations and amplitudes of the current sources and current sinks along the underwater structure 115, a linear inversion may be performed. For example, locations and strengths of current sources and current sinks along the underwater structure 115 are estimated (e.g., guessed) and the fields of these current sources and current sinks are modelled. The linear inversion assumes a number of current sources equal to the number of anodes 120 and iterates amplitudes of the assumed current sources until a minimum between the measured field values and the computed field values is solved for. That is, a difference between the modelled fields and the measured fields is computed for the assumed current sources, and this process is repeated until the difference is a minimum or below a threshold. Proposed current sinks are then introduced in an iterative fashion and the solver is used to find the minimum for each new addition. The relative improvement from the new current sink is used as a stop condition when the improvement is below a predefined threshold.

Using E-Field Curvature to Estimate Current Source Locations

Inventive concepts related to using the measured E-field to estimate current source locations will now be described.

The ocean may be considered a homogenous resistivity structure, so that the potential fields and current flow directions in the ocean are tractable for computation. The direction of the electric field in seawater points to the source of the electric current, in this case, the cathodic protection system comprising anodes 120.

At least one example embodiment measures the second derivative of the E-field, or the rate of change of the E-Field gradient, to estimate the curvature of the E-field, which is used to estimate the distance to the current source. For example, a distance from a point in the curvature to the current source is measured. In this manner, example embodiments provide a check or confirmation on the position of the current source, which is otherwise known from the other sensors on the vehicle 110.

Using a Relative Effective Potential (REP) to Estimate Current Source Locations

Inventive concepts related to using a REP to estimate current locations will now be described.

Potential in general may be described as the work required to move a charge from point a to b in the presence of an electric field E along a path 1, as in Equation 36:

$$V_{ab} = -\int_a^b E \cdot dl \quad (36)$$

Further, the line integral around a closed path is zero, as in Equation 37:

$$V = \oint_c E \cdot dl = 0 \quad (37)$$

Thus, the field around a pipeline (i.e., the underwater structure 115), which approximates a combination of point sources and is radially symmetric, will have equipotential lines at points of equal radius from the pipeline. In related art stab surveys, a measurement is taken at the pipe surface through contact with the metal pipe or anode and referred to a remote reference electrode. These potentials may range in value from around −600 mV to −1100 mV, where nominal values for a well-protected pipeline are around −1070 mV.

To approximate these values, example embodiments propose a relative effective potential which is defined as the in water potential that is taken immediately next to the pipe surface out to a point in infinity, as in Equation 38:

$$V_{REP} = -\int_{r_p}^{\infty} E \cdot dl \tag{38}$$

However, what is actually measured is the potential across each electrode pair on the vehicle 110. Let this difference be defined by the potential at $r_a$ and $r_b$ in Equation 39:

$$V_m = -\int_{r_a}^{r_b} E \cdot dl \tag{39}$$

Assuming that the pipe is composed primarily of point sources, then the electric field is given by the current density in the pipe divided by the conductivity of the medium in Equation 40:

$$E = \frac{J}{\sigma} \tag{40}$$

Here, the current density is given by the current in the pipe on a spherical surface in Equation 41:

$$J = \frac{i}{4\pi r^2} \tag{41}$$

As such the electric field is represented in Equation 42:

$$E = \frac{i}{4\pi r^2 \sigma} \tag{42}$$

Using this relation in the potential integrals results in the following simplifications in Equations 43 and 44:

$$V_{REP} = -\frac{i}{4\pi\sigma}(r_p^{-1} - \infty^{-1}) \tag{43}$$

$$V_m = -\frac{i}{4\pi\sigma}(r_a^{-1} - r_b^{-1}) \tag{44}$$

To scale between the measured and REP, divide the two relations so that the $$\frac{i}{4\pi\sigma}$$

terms fall out to result in Equation 45:

$$V_{REP} = \frac{V_m}{r_p(r_a^{-1} - r_b^{-1})} \tag{45}$$

For the measurement arrangement where there is assumed a pair of vertically (effective or otherwise) oriented electrodes the radius' $r_a$ and $r_b$ are represented by Equations 46 and 47:

$$r_a = \sqrt{y^2 + z_a^2} \tag{46}$$

$$r_b = \sqrt{y^2 + z_b^2} \tag{47}$$

In Equations 46 and 47, y is the cross track distance to the pipe and $z_a$ and $z_b$ are the vertical distances from the pipe 115 to electrode a and b, respectively, on the vehicle 110.

To determine $V_m$ it is useful to transform the measured $E_y$ and $E_z$ electric field components into the radial component $E_r$, as in Equation 48:

$$E_r = E_y E_z \tag{48}$$

Then, the measured potential becomes Equation 49:

$$V_m = E_r(r_a - r_b) \tag{49}$$

This results in Equation 50:

$$V_{REP} = \frac{E_r(r_a - r_b)}{r_p(r_a^{-1} - r_b^{-1})} \tag{50}$$

Figure 9:
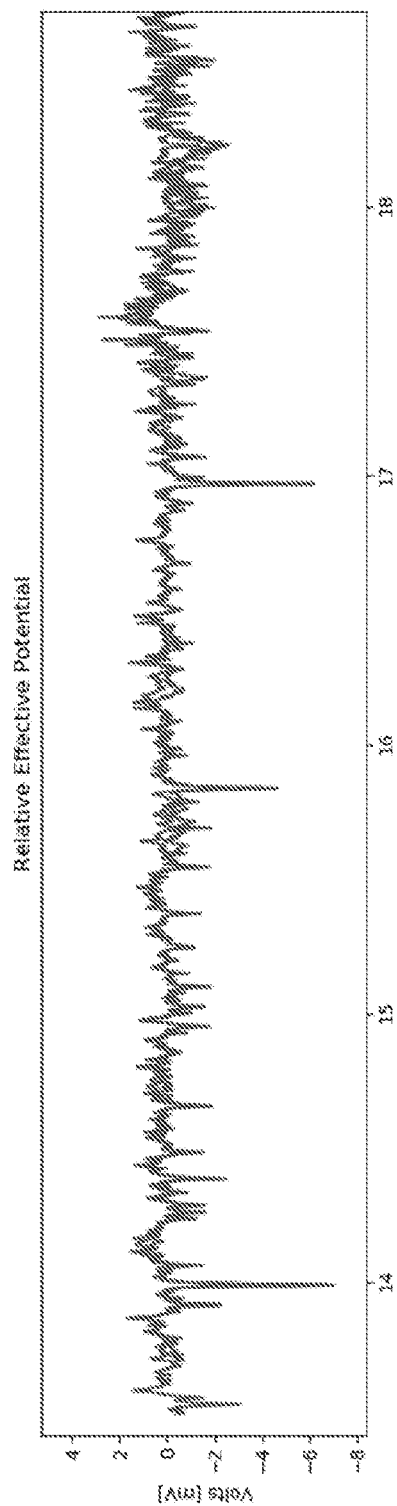
FIG. 9 illustrates graph showing a relative effect potential according to at least one example embodiment.

The measured potential may include instrument error terms which produce low frequency drift and bias. To remove these terms, a high pass filter may be used with a corner frequency which eliminates the bias and drift while still preserving the instantaneous potential. Thus the REP is useful showing local variations in potential to locate current sources. FIG. 9 illustrates the REP in mV as a function of along the pipe distance (e.g., in km). The sharp downward spikes (e.g., at about −6 mV and about −4 mV) indicate the possible existence of a current source/sink, such as an anode 120 or a fault 125. The value of mV may be interpreted to mean the existence of the anode 120 or fault 125 as well as to assess the health of the anode 120 or severity of the fault 125. In general, faults 125 are associated with lower measured electric fields (or lower potentials) than anodes 120 until the anodes 120 reach a certain deterioration level. Thus, if the value of mV is greater than a first threshold value, then an anode 120 may be determined to exist. Similarly, if the value of mV is less than a second threshold, then a fault 125 may be determined to exist. The first threshold may be greater than the second threshold. In addition, a lower value of mV for an anode 120 may correspond to a weakened anode 120, while a higher value of mV for a fault 125 may correspond to a more severe fault 125. Probabilities indicating a severity of the corrosion of the anode 120 or area having a fault 125 may be assigned to the values of mV. The probabilities may be based on statistics from prior surveys of similar underwater structures 115 and/or anodes 120.

Computing Remaining Anode Life

Inventive concepts related to calculating remaining anode life will now be described.

At the outset, a number of initial anode parameters may be known, such as anode dimensions including length and diameter (in cm), anode mass (net in kg), anode material (e.g., zinc/aluminum), anode capacity in amp/hrs/kg, burial ration %, utilization factor (u), and wastage %.

When the anode current output is calculated as described above, it is possible to estimate the remaining life of the anode 120 on the basis that the current output remains constant. The following Equations 51 and 52 are used to calculate the remaining life for anodes:

$$RL = ((Wo \times u) - W)/(I \times m) \tag{51}$$

$$W = (I \times m(Y - Yo))/u \tag{52}$$

In Equations 51 and 52, RL=remaining life of the anode (years); Wo=initial net weight of the anode (kg); u=utilization factor=0.85 (e.g., for bracelet anode); W=consumption of anode material (kg); I=output current of anode in A given by the measurement; m=practical consumption of anode (e.g., 3.62 Kg/A/year for Aluminum); Y=year of the survey; Yo=year of installation of the anode. Here, it should be understood that the value of m may be dependent on the electrochemical efficiency of the anode, which is based on temperature and composition.

Coincident, Parallel, and Non-Parallel Trajectories

Possible vehicle 110 trajectories with respect to the underwater structure 115 will now be described.

In at least one example embodiment, the vehicle 110 follows the underwater structure 115 with a coincident trajectory (e.g., aligned substantially directly above the underwater structure 110). This is suited for unburied underwater structures 115 where the location of the structure 115 is known, for example, from prior surveys. The coincident trajectory provides the vehicle's 110 camera with an opportunity to capture images of the underwater structure 115.

In at least one example embodiment, the vehicle 110 follows a non-coincident, parallel trajectory (i.e., a trajectory offset from the underwater structure 115 but still parallel to the underwater structure. For this trajectory, the electric field excites electrodes 300 to 325 with a high potential difference due to each having a different distance to the underwater structure 115, and thus the signal to noise ratio may be improved compared to the coincident trajectory where the difference in distances of electrodes 300 to 325 to the underwater structure 115 is smaller. Another improvement of the non-coincident parallel trajectory is due to the behavior of the vehicle's 110 altitude tracking and the increased elevation above the seabed that the underwater structure imposes. For example, some of the altitude measurements in a coincident trajectory will occur over the pipeline sometimes and at other times over the seabed. This difference may cause the vehicle 110 to oscillate in its altitude above the seabed, which oscillation may degrade the quality of acoustic, optical, and/or magnetic data products. The non-coincident parallel trajectory, however, avoids this oscillation.

In at least one example embodiment, the vehicle 110 follows the underwater structure 115 with a crisscrossing pattern that zig-zags back and forth over the underwater structure. This trajectory may be suited for cases where the underwater structure 115 is buried. In this pattern, the vehicle 110 trajectory may be at a shallow predefined angle to the underwater structure 115, cross the underwater structure 115 and proceed some distance past the underwater structure 115 axis before changing direction towards the underwater structure 115 again at the opposite shallow angle to the underwater structure 115. This pattern may enable a sub-bottom profiler to provide a ground truth measurement for the location of the buried underwater structure 115. At each crossing, the sub-bottom profiler observes the underwater structure's 115 location and depth of burial. Additionally, the crisscrossing pattern may naturally account for the uncertainty in the position of the underwater structure 115.

Figure 10:
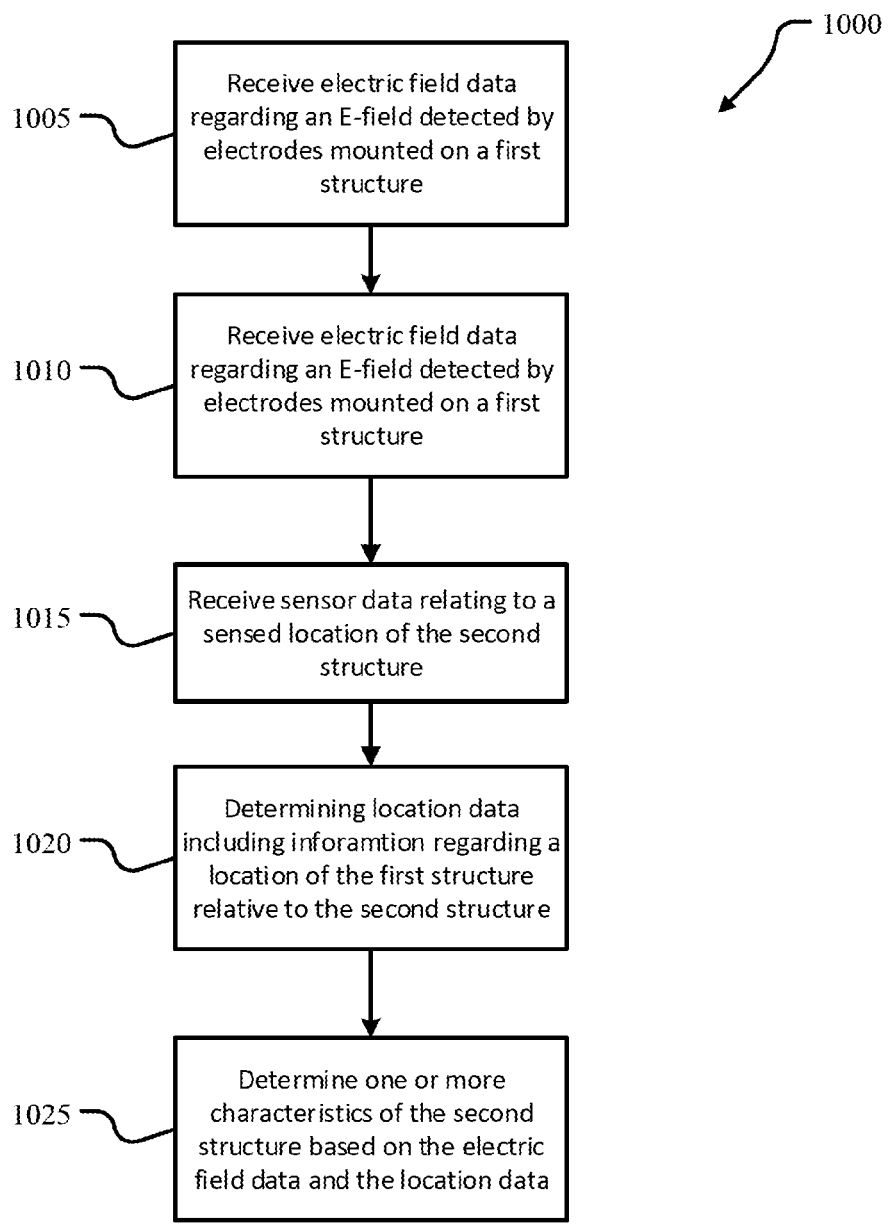
FIG. 10 illustrates a method according to at least one example embodiment.

FIG. 10 illustrates a method 1000 according to at least one example embodiment.

While a general order for the steps of the method 1000 is shown in FIG. 10, the method 1000 can include more or fewer steps or can arrange the order of the steps differently than those shown in FIG. 10. Generally, the method 1000 starts at operation 1005 and ends at operation 1025. The method 1000 may be performed by one or more processors (e.g., processors 200 and/or 215) executing instructions stored on a memory (e.g., memories 205 and/or 220). Additionally or alternatively, the method 1000 may be performed in whole or in part by one or more other elements described above with respect to inventive concepts. Hereinafter, FIG. 10 shall be explained with reference FIGS. 1-9.

In operation 1005, the method 1000 includes receiving electric field data regarding an electric field that is detected in an underwater environment by a plurality of electrodes mounted on a first structure. For example, as described above, the plurality electrodes 300 to 325 are mounted on the underwater vehicle 110 and detect a surrounding electric field while in the underwater environment 135.

In operation 1010, the method 1000 includes receiving sensor data from at least one sensor mounted on the first structure, where the sensor data relates to a sensed location of a second structure. For example, the at least one sensor mounted on the first structure may correspond to one or more sensors 225 associated with the underwater vehicle 110 while the second structure may correspond to the underwater structure 115. As noted above, the at least one sensor may include one or more cameras (visible light or infrared), multi-beam echosounders, profiling lasers, LIDAR scanners, etc. on the underwater vehicle 110 that detect a location of the underwater structure 115 from the perspective of the underwater vehicle 110.

In operation 1015, the method 1000 includes determining location data including information regarding a location the second structure relative to the first structure in the underwater environment based on the sensor data. For example, the method may include executing one or more of the above equations (e.g., Equations 7-11) relating to using sensor data from one or more cameras (visible light or infrared), multi-beam echosounders, profiling lasers, LIDAR scanners, etc. to determine the location of the second structure relative to the first structure. According to at least one example embodiment, determining the location data includes determining the location data based on the sensor data and other data, where the other data relates to a location of the first structure and/or the second sensed or provided by a third structure. Here, the third structure may be the surface vessel 105 and the other data may be data collected by a USBL system of the surface vessel 105 and/or data from prior surveys. The location data may further include data regarding installed locations of the anodes 120 along the underwater structure 115 for the purpose of identifying currents created by the electric field as currents belonging to anodes 120 or possible faults 125.

In operation 1020, the method 1000 includes determining one or more characteristics of the second structure based on the electric field data and the location data. For example, the method 1000 determines locations of anodes 120 and/or faults 125 based on the electric field data and the location data in accordance with at least one example embodiment discussed above (see e.g., the computation of anode currents and leakage currents discussed above). In addition, the method 100 may determine the anode remaining life and/or severity of a fault 125 in accordance with at least one example embodiment discussed above.

Figure 11:
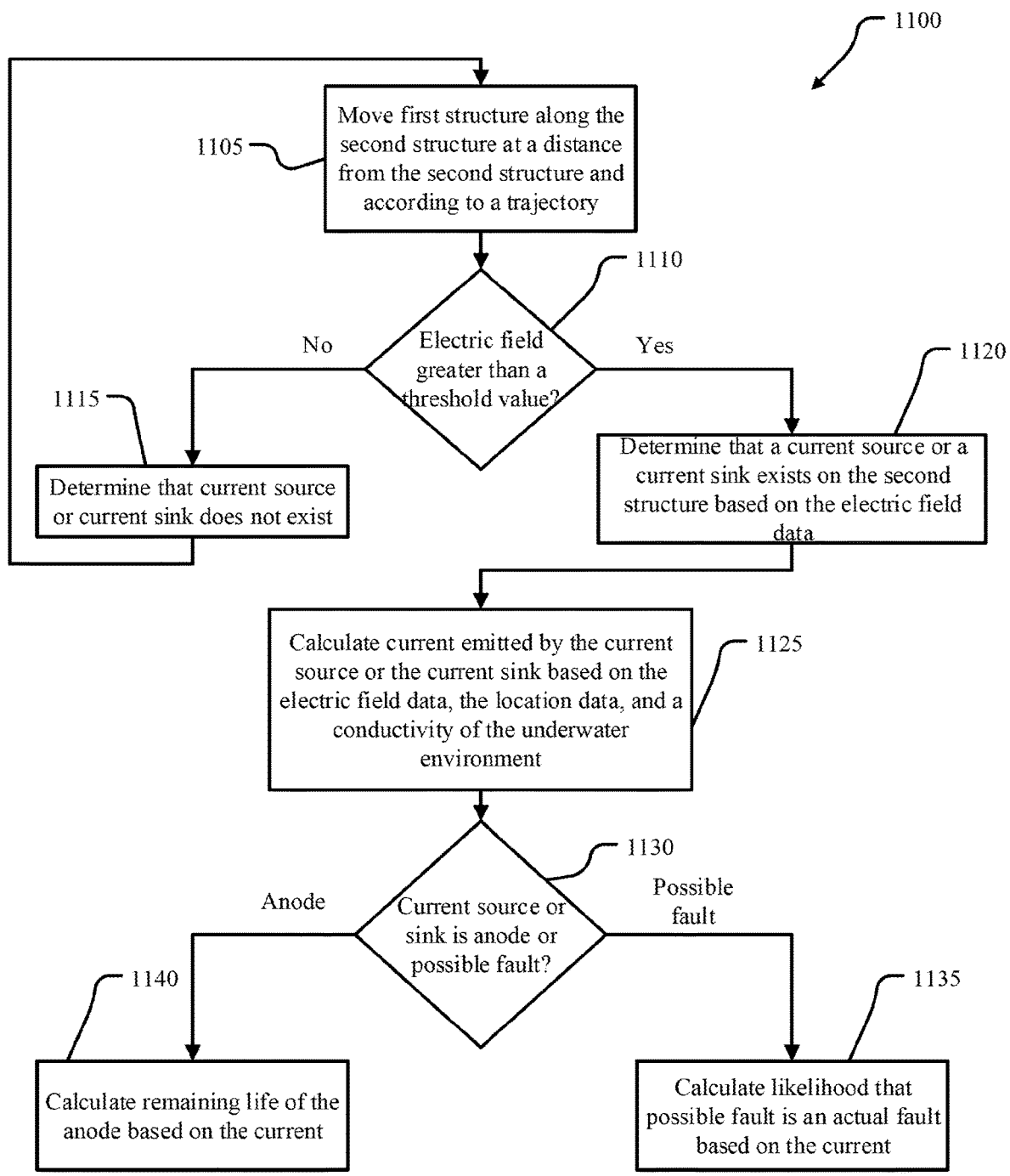
FIG. 11 illustrates a method according to at least one example embodiment.

FIG. 11 illustrates a method 1100 according to at least one example embodiment. For example, the method 1100 illustrates additional operations and/or additional details of the operation discussed with respect to FIG. 10.

While a general order for the steps of the method 1100 is shown in FIG. 11, the method 1100 can include more or fewer steps or can arrange the order of the steps differently than those shown in FIG. 11. Generally, the method 1100 starts at operation 1105 and ends at operation 1140. The method 1100 may be performed by one or more processors (e.g., processors 200 and/or 215) executing instructions stored on a memory (e.g., memories 205 and/or 220). Additionally or alternatively, the method 1100 may be performed in whole or in part by one or more other elements described above with respect to inventive concepts. Hereinafter, FIG. 11 shall be explained with reference FIGS. 1-10.

In operation 1105, the method 1100 includes moving the first structure along the second structure at a distance from the second structure and according to a trajectory to detect the electric field. For example, the method 1100 includes causing the vehicle 110 to move along the underwater structure 115 at a coincident trajectory, a non-coincident parallel trajectory, and/or a crisscrossing trajectory as desired.

In operation 1110, the method 1100 includes determining whether a detected electric field (or detected potential) at a particular location along the second structure is greater than (or greater than or equal to) a threshold value. For example, the method 1100 compares a magnitude of a detected electric field (or detected potential) along the underwater structure 115 to the threshold. If the magnitude is not greater than the threshold value, the method 1100 proceeds to operation 1115 and determines that a current source or a current sink does not exist on the second structure. If the magnitude is greater (or greater than or equal to) the threshold value, the method 1100 determines that a current source or a current sink exists on the second structure and then proceeds to operation 1125. For example, a current source is determined to exist if the magnitude of the measured field is greater than a first threshold value, and a current sink is determined to exist if the magnitude of the measured field is less than a second threshold value.

In operation 1125, the method 1100 includes calculating current emitted by the current source based on the electric field data, the location data, and a conductivity of the underwater environment 135. For example, the method 1100 calculates an anode current and/or a leakage current in accordance with example embodiments discussed above.

In operation 1130, the method 1100 determines whether the current source or the current sink is an anode or a possible fault based on the location data. For example, operation 1130 includes determining the current source be an anode 120 on the second structure based on the location data when the location data (which may include data regarding an installed location of the anode) indicates that an anode should be present at that particular location of the current source. Operation 1130 may include determining a current sink to be a possible fault 125 on the second structure based on the location data when the location data indicates that the anode 120 should not be present at that particular location of the current sink. For example, if the current source/sink is within a desired threshold distance of a known installed location of an anode 120 and/or if the current of the current source is over a current threshold, then the method 1100 may determine the current/sink source to be an anode 120. If the current source/sink is not within the desired threshold distance of the installed location of the anode 120 and/or if the current of the current source/sink is below the current threshold, then the method 110 may determine the current source/sink to be a possible fault 125.

If operation 1130 determines that the current source is a possible fault, the method 1100 proceeds to operation 1135 to calculate a likelihood that the possible fault is an actual fault based on the current. For example, if the current associated with the possible fault is over a desired threshold, then operation 1135 may identify the possible fault as an actual fault 125 (or assign probability that the possible fault is an actual fault) and issue an alert to an operator that the fault 125 warrants further inspection. If not, then operation 1135 may ignore the possible fault without providing the alert.

If operation 1130 determines that the current source is an anode, then the method 1100 may proceed to operation 1140 to calculate a remaining life of the anode 120 based on the current. The remaining life of the anode 120 may be calculated in accordance with example embodiments discussed above.

In view of the foregoing, it should be appreciated that example embodiments provide accurate cathodic protection surveying at reduced costs (both time and monetary) compared to related art methods in addition to other benefits and advantages readily apparent by those of ordinary skill in the art.

All thresholds and threshold values mentioned herein may be design parameters based on empirical evidence and/or preference.

At least one example embodiment relates to a method including receiving electric field data regarding an electric field that is detected in an underwater environment by a plurality of electrodes mounted on a first structure; receiving sensor data from at least one sensor mounted on the first structure, the sensor data relating to a sensed location of a second structure in the underwater environment; determining location data including information regarding a location of the second structure relative to the first structure in the underwater environment based on the sensor data; and determining one or more characteristics of the second structure based on the electric field data and the location data.

According to at least one example embodiment, the method includes determining a current sink or a current source to exist on the second structure based on the electric field data.

According to at least one example embodiment, the determining the current sink of the current source to exist includes determining the current source to exist in an area of the second structure when the electric field data indicates that the electric field in the area is greater than a first threshold value, and determining the current sink to exist in the area of the second structure when the electric field data indicates that the electric field in the area is less than a second threshold value.

According to at least one example embodiment, the method includes calculating current emitted by the current source based on the electric field data, the location data, and a conductivity of the underwater environment.

According to at least one example embodiment, the method includes determining the current source be an anode on the second structure based on the location data. The determining the one or more characteristics includes calculating a remaining life of the anode based on the current.

According to at least one example embodiment, the method includes determining the current source to be a possible fault on the second structure based on the location data.

According to at least one example embodiment, the determining the one or more characteristics includes calculating a likelihood of the possible fault being an actual fault based on the current.

According to at least one example embodiment, the location data includes determining the location data based on the sensor data and other data, the other data relating to a location of the first structure sensed by a third structure.

According to at least one example embodiment, the method includes moving the first structure along the second structure at a distance from the second structure and according to a trajectory to detect the electric field.

According to at least one example embodiment, the trajectory includes a coincident trajectory, a non-coincident parallel trajectory, or a crisscrossing trajectory.

At least one example embodiment relates to a device comprising a processor; and a memory including instructions that when executed by the processor cause the processor to: receive electric field data regarding an electric field that is detected in an underwater environment by a plurality of electrodes mounted on a first structure; receive sensor data from at least one sensor mounted on the first structure, the sensor data relating to a sensed location of a second structure in the underwater environment; determine location data including information regarding a location of the second structure relative to the first structure in the underwater environment based on the sensor data; and determine one or more characteristics of the second structure based on the electric field data and the location data.

According to at least one example embodiment, the instructions include instructions that cause the processor to determine a current sink or a current source to exist on the second structure based on the electric field data.

According to at least one example embodiment, the processor determines the current source to exist in an area of the second structure when the electric field data indicates that the electric field in the area is greater than a first threshold value, and determines the current sink to exist in the area of the second structure when the electric field data indicates that the electric field in the area is less than a second threshold value.

According to at least one example embodiment, the instructions include instructions that cause the processor to calculate current emitted by the current source based on the electric field data, the location data, and a conductivity of the underwater environment.

According to at least one example embodiment, the instructions include instructions that cause the processor to determine the current source be an anode on the second structure based on the location data, and to determine the one or more characteristics by calculating a remaining life of the anode based on the current.

According to at least one example embodiment, the instructions include instructions that cause the processor to determine the current source to be a possible fault on the second structure based on the location data.

According to at least one example embodiment, the processor determines the one or more characteristics by calculating a likelihood of the possible fault being an actual fault based on the current.

According to at least one example embodiment, the processor determines the location data based on the sensor data and other data, the other data relating to a location of the first structure sensed by a third structure.

At least one example embodiment relates to a system including an underwater vehicle; a plurality of electrodes mounted on the underwater vehicle and that detect a surrounding electric field in an underwater environment; at least one sensor mounted on the underwater vehicle and that senses a structure external to the underwater vehicle in the underwater environment to generate sensor data. The system includes a processor; and a memory including instructions that when executed by the processor cause the processor to: receive electric field data regarding the electric field that is detected by the plurality of electrodes; receive the sensor data; determine location data including information regarding a location of the structure relative to the underwater vehicle in the underwater environment based on the sensor data; and determine one or more characteristics of the structure based on the electric field data and the location data.

According to at least one example embodiment, the one or more characteristics include an estimated remaining life of an anode on the structure and an existence of a possible a fault on the structure.

Here, it should be understood that the above described example embodiments may be combined in any manner if desired.

As should be appreciated by one skilled in the art, aspects of example embodiments have been illustrated and described herein in any of a number of patentable classes or context including any new and useful process, machine, manufacture, or composition of matter, or any new and useful improvement thereof. Accordingly, aspects of example embodiments may be implemented entirely hardware, entirely software (including firmware, resident software, micro-code, etc.) or combining software and hardware implementation that may all generally be referred to herein as a "circuit," "module," "component," or "system." Furthermore, aspects of example embodiments may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code (i.e., instructions) for carrying out operations for aspects of example embodiments may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of example embodiments have been described herein with reference to flowchart illustrations and/or block diagrams of methods, apparatuses (systems) and computer program products according to embodiments of the disclosure. It should be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

Specific details were given in the description to provide a thorough understanding of the embodiments. However, it will be understood by one of ordinary skill in the art that the embodiments may be practiced without these specific details. In other instances, well-known circuits, processes, algorithms, structures, and techniques may be shown without unnecessary detail in order to avoid obscuring the embodiments.

While illustrative embodiments of the disclosure have been described in detail herein, it is to be understood that the inventive concepts may be otherwise variously embodied and employed, and that the appended claims are intended to be construed to include such variations, except as limited by the prior art.

What is claimed is:

1. A method comprising:
   receiving electric field data regarding an electric field that is detected in an underwater environment by a plurality of electrodes mounted on a first structure;
   generating corrected electric field data based on the electric field data and magnetic field data, the corrected electric field data compensating for electric potential values that are induced by motion of the first structure through the underwater environment;
   receiving sensor data from at least one sensor mounted on the first structure, the sensor data relating to a sensed location of a second structure in the underwater environment;
   determining location data including information regarding a location of the second structure relative to the first structure in the underwater environment based on the sensor data; and
   determining one or more characteristics of the second structure based on the corrected electric field data and the location data.

2. The method of claim 1, further comprising:
   determining a current sink or a current source to exist on the second structure based on the corrected electric field data.

3. The method of claim 2, wherein the determining the current source or the current sink to exist includes:
   determining the current source to exist in an area of the second structure when the corrected electric field data indicates that the electric field in the area is greater than a first threshold value; and
   determining the current sink to exist in the area of the second structure when the corrected electric field data indicates that the electric field in the area is less than a second threshold value.

4. The method of claim 3, further comprising:
   calculating current emitted by the current source or calculating current drained by the current sink, based on the corrected electric field data, the location data, and a conductivity of the underwater environment.

5. The method of claim 4, further comprising:
   determining the current source be an anode on the second structure based on the location data, and wherein the determining the one or more characteristics includes calculating a remaining life of the anode based on the current.

6. The method of claim 4, further comprising:
   determining the current sink to be a possible fault on the second structure based on the location data.

7. The method of claim 6, wherein the determining the one or more characteristics includes calculating a likelihood of the possible fault being an actual fault based on the current.

8. The method of claim 1, wherein the determining the location data includes determining the location data based on the sensor data and other data, the other data relating to a location of the first structure sensed by a third structure.

9. The method of claim 1, further comprising:
   moving the first structure along the second structure at a distance from the second structure and according to a trajectory to detect the electric field.

10. The method of claim 9, wherein the trajectory includes a coincident trajectory, a non-coincident parallel trajectory, or a crisscrossing trajectory.

11. A device, comprising:

a processor; and a memory including instructions that when executed by the processor cause the processor to:

receive electric field data detected in an underwater environment by a plurality of electrodes mounted on a first structure, the plurality of electrodes including at least two pairs of electrodes, the electric field data including x, y, and z electric fields detected by the at least two pairs of electrodes;

determine a radial electric field based on the x, y, and z electric fields;

receive sensor data from at least one sensor mounted on the first structure, the sensor data relating to a sensed location of a second structure in the underwater environment;

determine location data including information regarding a location of the second structure relative to the first structure in the underwater environment based on the sensor data; and determine one or more characteristics of the second structure based on the radial electric field and the location data.

12. The device of claim 11, wherein the instructions include instructions that cause the processor to:

convert the detected x, y, and z electric fields from a frame of reference of the first structure to a frame of reference of the second structure and determine the radial electric field based on the converted x, y, and z electric fields; and determine a current source or a current sink to exist on the second structure based on the radial electric field data.

13. The device of claim 12, wherein the processor:

determines the current source to exist in an area of the second structure when the radial electric field in the area is greater than a first threshold value; and determine the current sink to exist in the area of the second structure when the radial electric field in the area is less than a second threshold value.

14. The device of claim 13, wherein the instructions include instructions that cause the processor to calculate current emitted by the current source or calculate current drained by the current sink based on the radial electric field, the location data, and a conductivity of the underwater environment.

15. The device of claim 14, wherein the instructions include instructions that cause the processor to determine the current source be an anode on the second structure based on the location data, and to determine the one or more characteristics by calculating a remaining life of the anode based on the current.

16. The device of claim 14, wherein the instructions include instructions that cause the processor to determine the current sink to be a possible fault on the second structure based on the location data.

17. The device of claim 16, wherein the processor determines the one or more characteristics by calculating a likelihood of the possible fault being an actual fault based on the current.

18. The device of claim 11, wherein the processor determines the location data based on the sensor data and other data, the other data relating to a location of the first structure sensed by a third structure.

19. A system, comprising:

an underwater vehicle;

a plurality of electrodes mounted on the underwater vehicle and that detect a surrounding electric field in an underwater environment, wherein the plurality of electrodes includes two first electrodes aligned with one another in a first direction on the underwater vehicle and two second electrodes aligned with one another in a second direction on the underwater vehicle, the second direction being different than the first direction;

at least one sensor mounted on the underwater vehicle and that senses a structure external to the underwater vehicle in the underwater environment to generate sensor data;

a processor; and a memory including instructions that when executed by the processor cause the processor to:

receive electric field data regarding the electric field that is detected by the plurality of electrodes;

receive the sensor data;

determine location data including information regarding a location of the structure relative to the underwater vehicle in the underwater environment based on the sensor data; and determine one or more characteristics of the structure based on the electric field data and the location data.

20. The system of claim 19, wherein the one or more characteristics include an estimated remaining life of an anode on the structure and an existence of a possible a fault on the structure.

* * * * *